US012574451B2

(12) United States Patent
Park et al.

(10) Patent No.: US 12,574,451 B2
(45) Date of Patent: Mar. 10, 2026

(54) CAMERA ASSEMBLY AND ELECTRONIC DEVICE INCLUDING SAME

(71) Applicant: Samsung Electronics Co., Ltd.,
Suwon-si (KR)

(72) Inventors: Changi Park, Suwon-si (KR); Jeongho Kang, Suwon-si (KR); Namwoo Kim, Suwon-si (KR); Minho Kim, Suwon-si (KR); Hyunchul Hong, Suwon-si (KR); Byoungjun Kim, Suwon-si (KR); Jaeuk Ahn, Suwon-si (KR); Yeonggyu Yoon, Suwon-si (KR); Junyoung Choi, Suwon-si (KR); Byounguk Yoon, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 71 days.

(21) Appl. No.: 18/585,543

(22) Filed: Feb. 23, 2024

(65) Prior Publication Data

US 2024/0406298 A1     Dec. 5, 2024

Related U.S. Application Data

(63) Continuation of application No. PCT/KR2024/095311, filed on Feb. 16, 2024.

(30) Foreign Application Priority Data

Jun. 2, 2023    (KR) ........................ 10-2023-0071910
Jun. 27, 2023    (KR) ........................ 10-2023-0082500

(51) Int. Cl.
| | |
|---|---|
| *H04M 1/02* | (2006.01) |
| *H04N 23/51* | (2023.01) |
| *H04N 23/54* | (2023.01) |
| *H04N 23/55* | (2023.01) |
| *H04N 23/57* | (2023.01) |
| *H04N 23/68* | (2023.01) |

(52) U.S. Cl.
CPC ....... *H04M 1/0264* (2013.01); *H04M 1/0266* (2013.01); *H04N 23/51* (2023.01);
(Continued)

(58) Field of Classification Search
CPC ...... H04N 23/687; H04N 23/54; H04N 23/57; H04N 23/55; H04N 23/51; H04M 1/0266; H04M 1/0264
(Continued)

(56) References Cited

U.S. PATENT DOCUMENTS

| | | | | |
|---|---|---|---|---|
| 9,674,418 B2 * | 6/2017 | Zeng | ...................... | G03B 17/17 |
| 11,336,828 B2 * | 5/2022 | Chang | .................. | G03B 17/565 |

(Continued)

FOREIGN PATENT DOCUMENTS

| | | |
|---|---|---|
| CN | 105556385 A | 5/2016 |
| CN | 106576138 A | 4/2017 |

(Continued)

OTHER PUBLICATIONS

Search Report and Written Opinion dated May 16, 2024 issued in International Patent Application No. PCT/KR2024/095311.

*Primary Examiner* — Pritham D Prabhakher
(74) *Attorney, Agent, or Firm* — Nixon & Vanderhye P.C.

(57) ABSTRACT

The disclosure relates to an electronic device. An electronic device according to an embodiment of the disclosure includes: a display defining a first surface of the electronic device, a housing defining a second surface of the electronic device spaced apart from the first surface, and a camera assembly at least partially disposed between the first surface and the second surface. The camera assembly includes: a case including a first camera hole open toward the first surface and a second camera hole open toward the second side, a rotary body rotatably disposed between the first camera hole and the second camera hole and including a first (Continued)

reflective surface configured to reflect light passing through the first camera hole, and a second reflective surface configured to reflect light passing through the second camera hole, an image sensor spaced apart from the rotary body and configured to receive the light reflected from the first and/or second reflective surface, a lens barrel disposed between the image sensor and the rotating body, a lens disposed inside the lens barrel, and an actuator configured to move the image sensor along a direction in which the image sensor and the rotary body are spaced apart from each other.

19 Claims, 20 Drawing Sheets

(52) U.S. Cl.
  CPC ............. *H04N 23/54* (2023.01); *H04N 23/55* (2023.01); *H04N 23/57* (2023.01); *H04N 23/687* (2023.01)

(58) Field of Classification Search
  USPC ......................................................... 348/373
  See application file for complete search history.

(56) References Cited

U.S. PATENT DOCUMENTS

| | | | | |
|---|---|---|---|---|
| 11,496,657 B2 * | 11/2022 | Lee | ......................... | G03B 37/00 |
| 11,785,320 B2 * | 10/2023 | Jun | ......................... | H04N 23/55 |
| | | | | 348/335 |
| 11,889,172 B2 * | 1/2024 | Kwon | ..................... | H04N 23/55 |
| 11,991,446 B2 * | 5/2024 | Song | ..................... | H04N 23/695 |
| 2003/0036365 A1 * | 2/2003 | Kuroda | ............... | H04M 1/0214 |
| | | | | 455/575.1 |
| 2014/0218587 A1 * | 8/2014 | Shah | ....................... | H04N 23/55 |
| | | | | 348/340 |
| 2015/0042870 A1 | 2/2015 | Chan | | |
| 2016/0044250 A1 | 2/2016 | Shabtay | | |
| 2016/0080622 A1 * | 3/2016 | Zeng | ....................... | H04N 23/55 |
| | | | | 348/369 |
| 2018/0299651 A1 * | 10/2018 | Yu | ....................... | H02K 41/0354 |
| 2021/0103131 A1 | 4/2021 | Shabtay | | |
| 2021/0136261 A1 | 5/2021 | Lee | | |
| 2022/0030141 A1 | 1/2022 | Jun | | |
| 2022/0030168 A1 * | 1/2022 | Chang | ..................... | H04N 23/55 |
| 2022/0210299 A1 * | 6/2022 | Kwon | ..................... | H04N 23/51 |
| 2022/0417405 A1 * | 12/2022 | Song | ..................... | H04N 23/90 |
| 2024/0272519 A1 | 8/2024 | Go et al. | | |

FOREIGN PATENT DOCUMENTS

| | | |
|---|---|---|
| CN | 110266851 A | 9/2019 |
| CN | 211184065 | 8/2020 |
| KR | 10-2009-0077605 | 7/2000 |
| KR | 10-2005-0101051 | 10/2005 |
| KR | 10-2005-0105408 | 11/2005 |
| KR | 20180012688 A | 2/2018 |
| KR | 20190119832 A | 10/2019 |
| KR | 10-2019-0124054 | 11/2019 |
| KR | 102345109 B1 | 12/2021 |
| KR | 10-2023-0030167 A | 3/2023 |

* cited by examiner

CAMERA ASSEMBLY AND ELECTRONIC DEVICE INCLUDING SAME

CROSS-REFERENCE TO RELATED APPLICATIONS

This application is a continuation of International Application No. PCT/KR2024/095311 designating the United States, filed on Feb. 16, 2024, in the Korean Intellectual Property Receiving Office and claiming priority to Korean Patent Application Nos. 10-2023-0071910, filed on Jun. 2, 2023, and 10-2023-0082500, filed on Jun. 27, 2023, in the Korean Intellectual Property Office, the disclosures of each of which are incorporated by reference herein in their entireties.

BACKGROUND

Field

The disclosure relates to an electronic device. For example, various embodiments relate to an electronic device including a camera assembly.

Description of Related Art

With the remarkable development of information communication technology, semiconductor technology, and the like, the distribution and use of various electronic devices are rapidly increasing. In particular, recent electronic devices are being developed such that users are capable of communicating with each other while carrying the electronic devices.

Electronic devices may refer, for example, to devices that perform specific functions according to programs installed therein, such as home appliances, electronic schedulers, portable multimedia players, mobile communication terminals, tablet PCs, video/audio devices, desktop/laptop computers, and a vehicle navigation systems. For example, these electronic devices may output information stored therein as sound or video. With the increase of degree of integration of electronic devices and the generalization of ultra-high-speed and high-capacity wireless communication, recently, various functions are capable of being installed in a single electronic device, such as a mobile communication terminal. For example, in addition to communication functions, entertainment functions such as games, multimedia functions such as music/video playback, communication and security functions such as mobile banking, schedule management functions, and electronic wallet functions, are being integrated into a single electronic device. These electronic devices are being downsized to be conveniently carried by users.

SUMMARY

An electronic device according to an example embodiment of the disclosure includes: a display defining a first surface of the electronic device, a housing defining a second surface of the electronic device spaced apart from the first surface, and a camera assembly at least partially disposed between the first surface and the second surface. The camera assembly includes: a case including a first camera hole opened toward the first surface and a second camera hole opened toward the second surface, a rotary body rotatably disposed between the first camera hole and the second camera hole and including a first reflective surface configured to reflect light passing through the first camera hole, and a second reflective surface on configured to reflect light passing through the second camera hole, an image sensor spaced apart from the rotary body and configured to receive the light reflected from the first or second reflective surface, a lens barrel disposed between the image sensor and the rotating body, a lens disposed inside the lens barrel, and an actuator configured to move the image sensor along a direction in which the image sensor and the rotary body are spaced apart from each other.

An electronic device according to an example embodiment of the disclosure includes: a housing including a first surface and a second surface spaced apart from the first surface, and a camera assembly at least partially disposed between the first surface and the second surface and including a space defined therein configured to allow light to propagate. The camera assembly includes: a first wall facing the first surface and including a first camera hole opened toward the space, a second wall facing the second surface, spaced apart from the first wall, and including a second camera hole opened toward the space, a first coil surrounding at least a portion of the first camera hole, a second coil surrounding at least a portion of the second camera hole, a rotary body rotatably disposed between the first camera hole and the second camera hole, a first magnetic body comprising a magnetic material disposed to be movable together with the rotary body, a second magnetic body comprising a magnetic material disposed to be movable together with the rotary body, a first reflective surface configured to be coupled to the first coil to close the first camera hole by magnetic force between the first coil and the first magnetic material, a second reflective surface configured to be coupled to the second coil to close the second camera hole by magnetic force between the second coil and the second magnetic material, and a sensor configured to receive light reflected from the first reflective surface or the second reflective surface.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
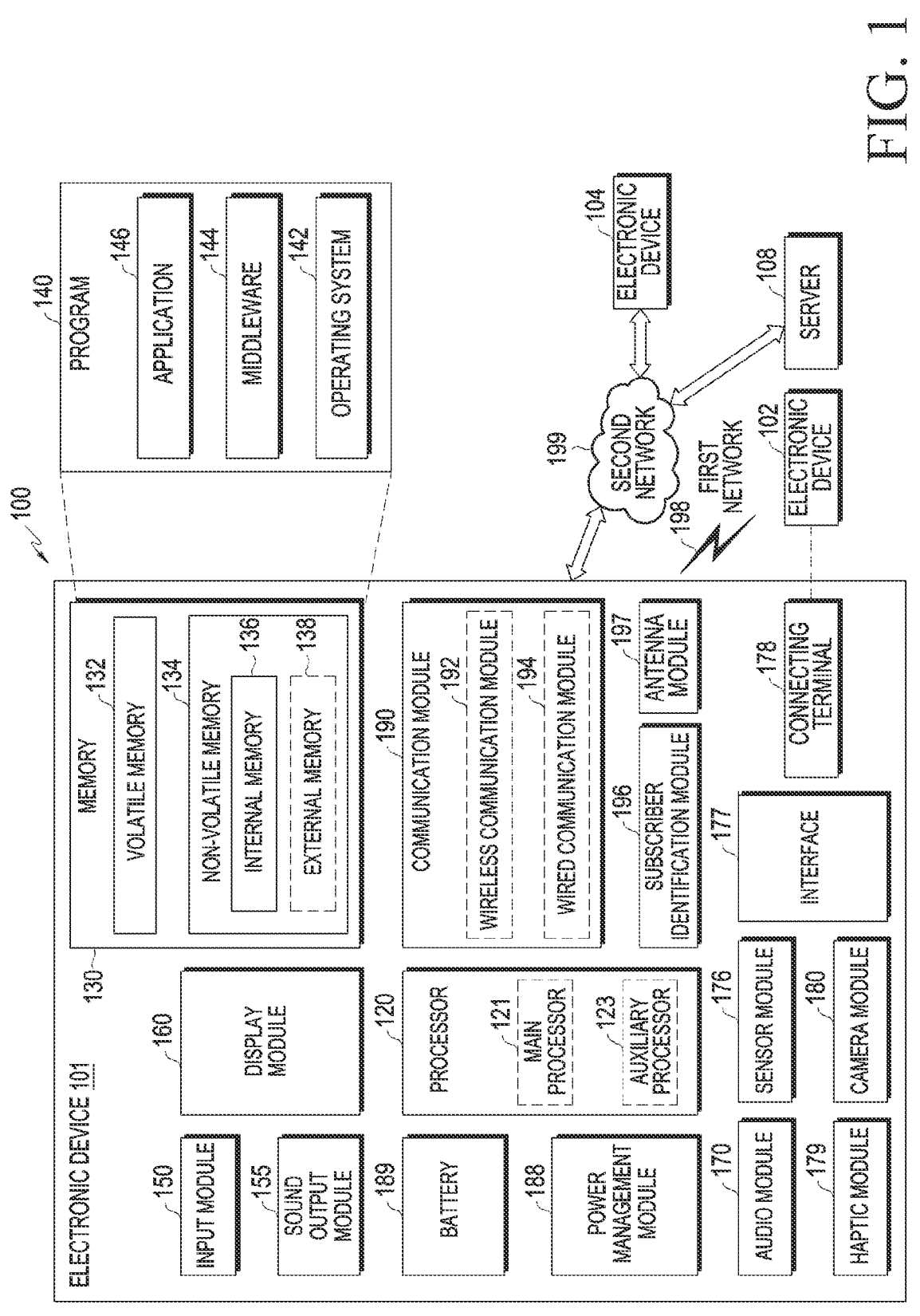
FIG. 1 is a block diagram illustrating an example electronic device in a network environment according to various embodiments.

FIG. 1 is a block diagram illustrating an example electronic device 101 in a network environment 100 according to embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and nay not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
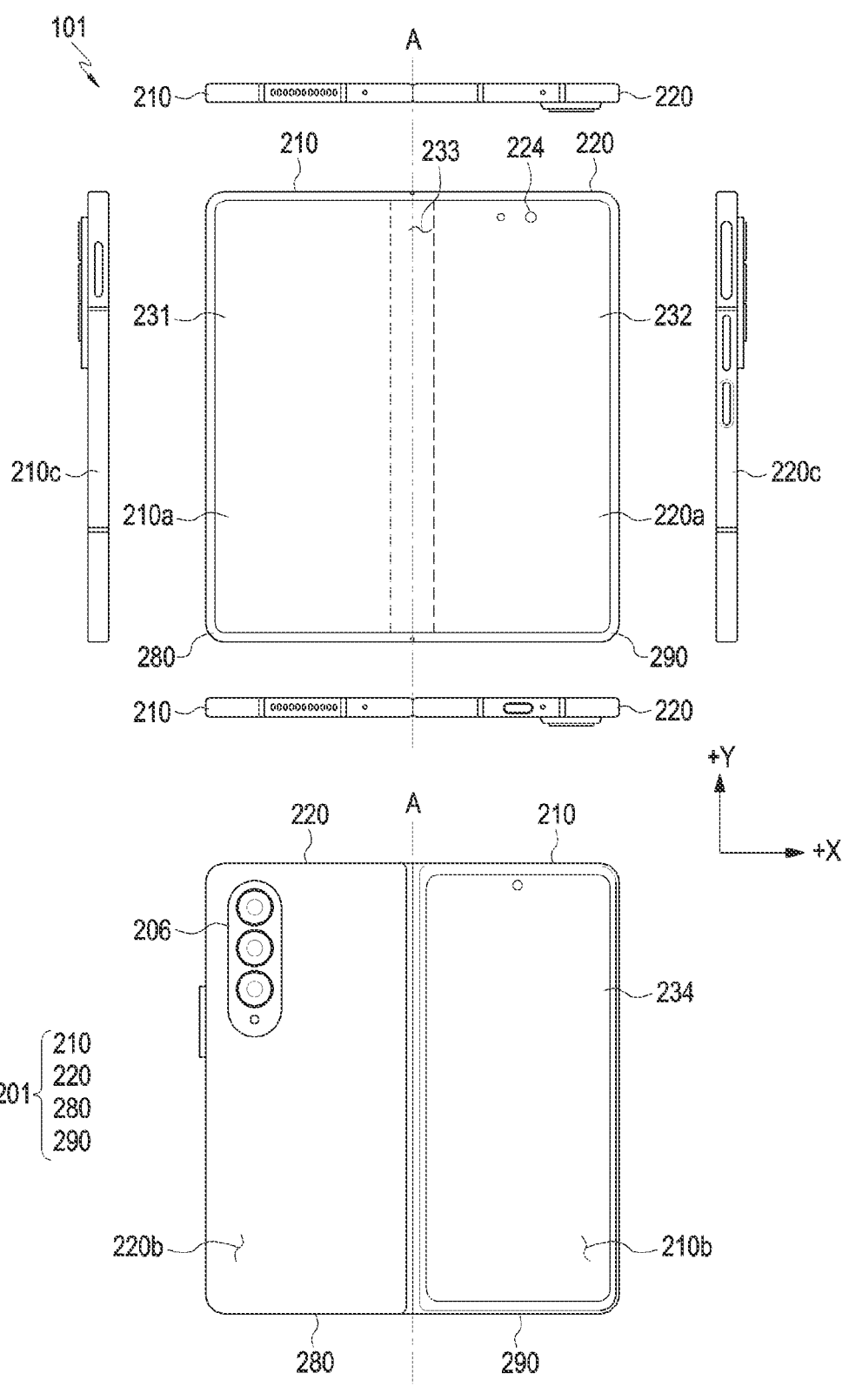
FIG. 2 is a diagram illustrating an unfolded state of an electronic device according to various embodiments.
Figure 3:
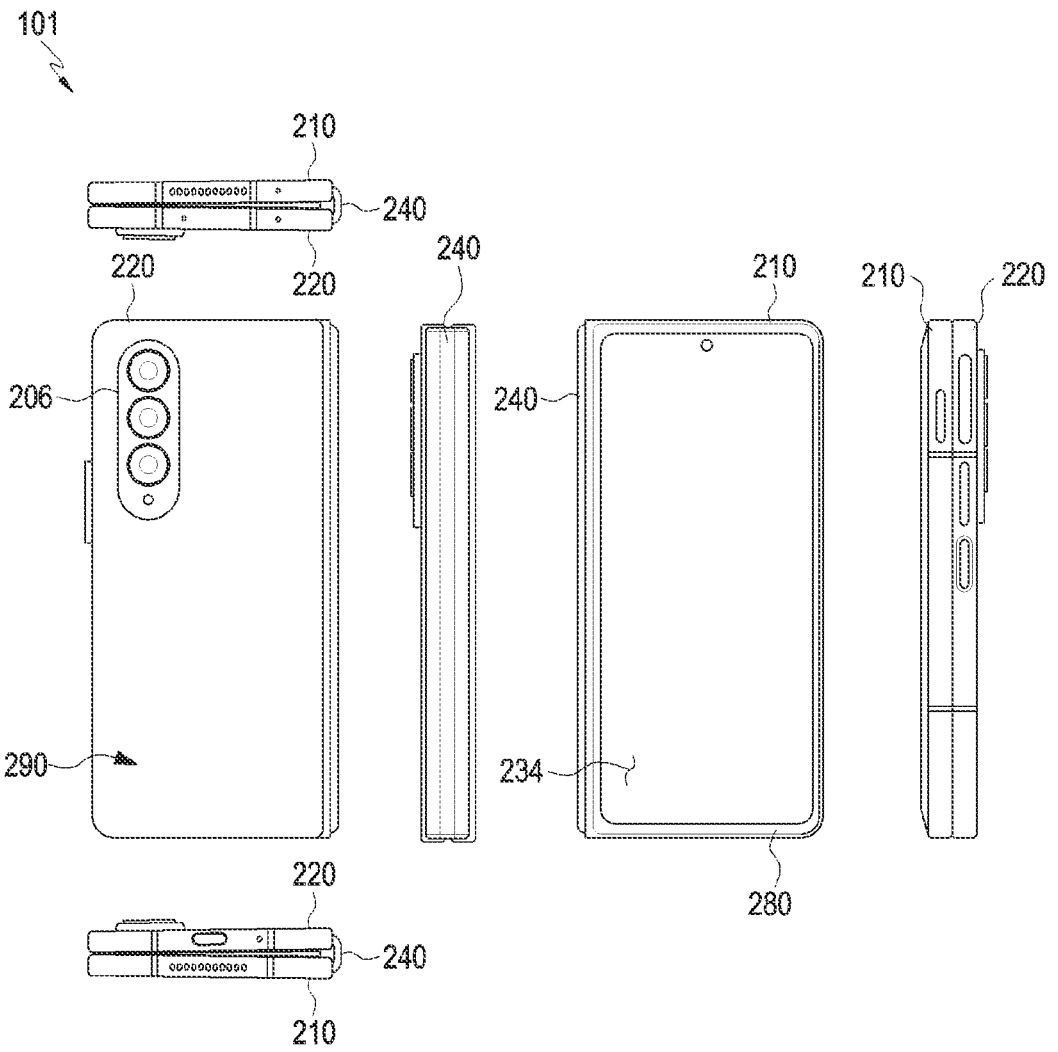
FIG. 3 is a diagram illustrating a folded state of the electronic device according to various embodiments.

FIG. 2 is a diagram illustrating an unfolded state of an electronic device according to various embodiments. FIG. 3 is a diagram illustrating a folded state of the electronic device according to various embodiments.

Referring to FIGS. 2 and 3, an electronic device 101 may include a housing 201, a hinge cover 240 configured to cover a foldable portion of the housing 201, and a display 230 disposed in a space defined by the housing 201. According to an embodiment, the surface on which a screen output from the display 230 is visible is defined as the front surface of the electronic device 101 (e.g., a first front surface 210a and a second front surface 220a). The surface opposite to the front surface is defined as the rear surface of the electronic device 101 (e.g., a first rear surface 210b and a second rear surface 220b). In addition, a surface surrounding the space between the front and rear surfaces is defined as the side surface (e.g., a first side surface 210c and a second side surface 220c) of the electronic device 101. The side surface of the electronic device 101 may be the side surface of at least one of the first housing 210 or the second housing 220. The electronic device 101 of FIGS. 2 and 3 may be referred to as a "foldable electronic device", a "portable electronic device", or a "portable foldable electronic device". According to an embodiment, the housing 201 may be referred to as a "foldable housing". The display 230 may be called a "flexible display".

According to an embodiment, the housing 201 may include a first housing 210, a second housing 220 rotatable with respect to the first housing 210, a first rear surface cover 280, and a second rear surface cover 290. The housing 201 of the electronic device 101 is not limited to the shape and assembly illustrated in FIGS. 2 and 3, but may be implemented by combinations and/or assemblies of other shapes or components. For example, in an embodiment, the first housing 210 and the first rear surface cover 280 may be integrally configured, and the second housing 220 and the second rear surface cover 290 may be integrally configured.

According to an embodiment, the first housing 210 may include a first front surface 210a connected to a hinge structure (e.g., the hinge structure 202 in FIG. 4) and oriented in a first direction and a first rear surface 210b oriented in a second direction opposite to the first direction. The second housing 220 is connected to the hinge assembly 202 and includes a second front surface 220a oriented in a third direction, and a second rear surface 220b oriented in a fourth direction opposite to the third direction. The second housing 220 is rotatable with respect to the first housing 210 around the hinge assembly 202. Accordingly, the electronic device 101 may be transformable into a folded state or an unfolded state. When the electronic device 101 is in the folded state, the first front surface 210a may face the second front surface 220a, and when the electronic device 101 is in the unfolded state, the third direction may be the same as the first direction. Hereinbelow, unless otherwise stated, directions will be described with reference to the unfolded state of the electronic device 101.

According to an embodiment, the first housing 210 and the second housing 220 may be disposed on opposite sides about the folding axis A and may have generally symmetrical shapes with respect to the folding axis A. As will be described later, the angle or distance between the first housing 210 and the second housing 220 may vary depending on whether the electronic device 101 is in the unfolded state, in the folded state, or in the intermediate state. According to an embodiment, the second housing 220 additionally includes a sensor area 224 where sensors (e.g., a front camera) are disposed, but the second housing 220 may have a symmetrical shape with respect to the first housing 210 in other areas.

According to an embodiment, the folding axis A may be a plurality of (e.g., two) parallel folding axes. In the disclosure, the folding axis A is provided along the longitudinal direction (the Y-axis direction) of the electronic device 101, but the direction of the folding axis A is not limited thereto. For example (not illustrated), the electronic device 101 may include a folding axis A extending along the width direction (e.g., the X-axis direction).

According to an embodiment, the electronic device 101 may include a structure to which a digital pen can be attached. For example, the electronic device 101 may include a magnetic body configured to attach the digital pen to the side surface of the first housing 210 or the side surface of the second housing 220. According to an embodiment, the electronic device 101 may include a structure into which a digital pen is insertable. For example, a hole (not illustrated) into which the digital pen is insertable may be provided in the side surface of the first housing 210 or the side surface of the second housing 220 of the electronic device 101.

According to an embodiment, the first housing 210 and the second housing 220 may be at least partially made of a metal or non-metal material having rigidity in a level selected in order to support the display 230. The at least a portion made of the metal material may provide a ground plane of the electronic device 101, and may be electrically connected to a ground line provided on a printed circuit board (e.g., the board unit 260 in FIG. 4).

According to an embodiment, the sensor area 224 may be defined to have a predetermined area adjacent to an edge or a corner of the second housing 220. However, the arrangement, shape, and size of the sensor area 224 are not limited to the illustrated example. For example, in other embodiments, the sensor area 224 may be provided at another corner or at any area between the upper and lower end corners in the second housing 220 or in the first housing 210. In an embodiment, components embedded in the electronic device 101 to carry out various functions may be exposed on the front surface of the electronic device 101 through the sensor area 224 or through one or more openings provided in the sensor area 224. In various embodiments, the components may include various types of sensors. The sensors may include, for example, at least one of a front camera, a receiver, or a proximity sensor.

According to an embodiments, the first rear surface cover 280 may be disposed on the rear surface of the electronic device 101 on one side of the folding axis A and may have, for example, a substantially rectangular periphery, which may be surrounded by the first housing 210. Similarly, the second rear surface cover 290 may be arranged on the other side of the folding axis A of the rear surface of the electronic device 101, and the periphery of the second rear surface cover 290 may be enclosed by the second housing 220.

According to an embodiment, the first rear surface cover 280 and the second rear surface cover 290 may have substantially symmetrical shapes about the folding axis (the axis A). However, the first rear surface cover 280 and the second rear surface cover 290 do not necessarily have mutually symmetrical shapes, and in an embodiment, the electronic device 101 may include a first rear surface cover 280 and a second rear surface cover 290 having various shapes.

According to an embodiment, the first rear surface cover 280, the second rear surface cover 290, the first housing 210, and the second housing 220 may define a space in which various components (e.g., a printed circuit board or a battery) of the electronic device 101 may be disposed. According to an embodiment, one or more components may be disposed or visually exposed on the rear surface of the electronic device 101. For example, at least a portion of the sub-display (e.g., the sub-display 244 in FIG. 4) may be visible through at least a portion of the first rear surface cover 280. In an embodiment, one or more components or sensors may be visually exposed through at least a portion of the second rear surface cover 290. In various embodiments, the sensors may include a proximity sensor and/or a camera module 206 (e.g., a rear camera).

According to an embodiment, a front camera exposed to the front surface of the electronic device 101 through one or more openings provided in the sensor area 224 or a camera module 206 exposed through at least a portion of the second rear surface cover 290 may include one or more lenses, an image sensor, and/or an image signal processor. In various embodiments, two or more lenses (e.g., an infrared camera, a wide-angle lens, and a telephoto lens), and image sensors may be arranged on one surface of the electronic device 101.

Figure 4:
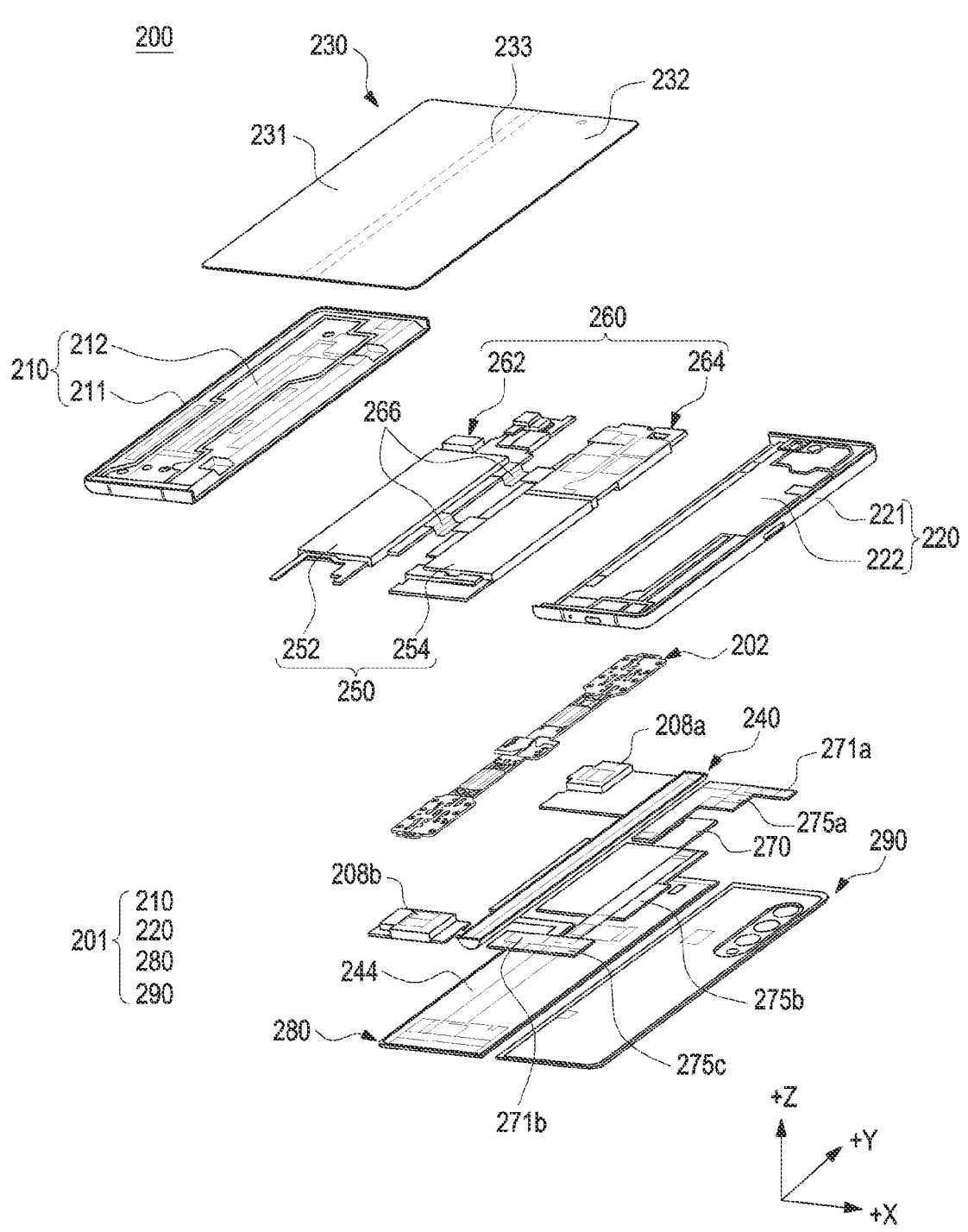
FIG. 4 is an exploded perspective view of an electronic device according to various embodiments.

According to an embodiment, the hinge cover 240 is disposed between the first housing 210 and the second housing 220 and may cover internal components (e.g., the hinge assembly 202 in FIG. 4). According to an embodiment, the hinge cover 240 may be covered by a portion of the first housing 210 and a portion of the second housing 220, or may be exposed to the outside depending on the state of the electronic device 101 (the unfolded state (flat state) or the folded state).

According to an embodiment, as illustrated in FIG. 2, when the electronic device 101 is in the unfolded state, the hinge cover 240 may not be exposed by being covered by the first housing 210 and the second housing 220. As another example, as illustrated in FIG. 3, when the electronic device 101 is in the folded state (e.g., the fully folded state), the hinge cover 240 may be exposed to the outside between the first housing 210 and the second housing 220. As another example, when the first housing 210 and the second housing 220 are in the intermediate state in which the first and second housings are folded with a certain angle therebetween, the hinge cover 240 may be partially exposed to the outside between the first housing 210 and the second housing 220. However, in this case, the exposed area may be smaller than that in the fully folded state. In an embodiment, the hinge cover 240 may include a curved surface.

According to an embodiment, the display 230 may be placed in the space defined by the housing 201. For example, the display 230 may be seated in a recess defined by the housing 201, and may include most of the front surface of the electronic device 101. Accordingly, the front surface of the electronic device 101 may include the display 230, and partial areas of the first housing 210 and the second housing 220, which are adjacent to the display 230. The rear surface of the electronic device 101 may include the first rear surface cover 280, a partial area of the first housing 210 adjacent to the first rear surface cover 280, the second rear surface cover 290, and a partial area of the second housing 220 adjacent to the second rear surface cover 290.

According to an embodiment, the display 230 may include a plurality of displays spaced apart from each other. For example, the display 230 may include a first display area 231 disposed on the first housing 210 and a second display area 232 disposed on the second housing 220. According to an embodiment, the first display area 231 and the second display area 232 may be rotatable about the folding axis A.

According to an embodiment, the display 230 may refer to a display that is at least partially deformable into a planar surface or a curved surface. For example, the display 230 may be a foldable or flexible display. According to an embodiment, the display 230 may include a folding area 233, a first display area 231 disposed on one side of the folding area 233 (e.g., the left side of the folding area 233 illustrated in FIG. 2), and a second display area 232 disposed on the other side of the folding area 233 (e.g., the right side of the folding area 203 illustrated in FIG. 2). However, the area division of the display 230 is illustrative, and the display 230 may be divided into multiple areas (e.g., four or more areas or two areas) depending on the structure or functions thereof. For example, in the example illustrated in FIG. 2, the area of the display 230 may be divided by the folding area 233 or the folding axis (the axis A) extending parallel to the Y axis. However, in an embodiment, the area of the display 230 may be divided based on another folding area (e.g., a folding area parallel to the X axis) or another folding axis (e.g., a folding axis parallel to the X axis). According to an embodiment, the display 230 may be coupled to or disposed adjacent to a touch-sensitive circuit, a pressure sensor that is capable of measuring touch intensity (pressure), and/or a digitizer (not illustrated) configured to detect a magnetic field-type stylus pen.

According to an embodiment, the first display area 231 and the second display area 232 may have generally symmetrical shapes with respect to the folding area 233. According to an embodiment (not illustrated), unlike the first display area 231, the second display area 232 may include a notch cut due to the presence of the sensor area 224, but may have a shape symmetrical to the first display area 231 in areas other than the sensor area. In other words, the first display area 231 and the second display area 232 may include portions having mutually symmetrical shapes and portions having mutually asymmetrical shapes.

Hereinafter, the operations of the first housing 210 and the second housing 220 depending on the states of the electronic device 101 (e.g., a flat or unfolded state and a folded state) and respective areas of the display 230 will be described.

According to an embodiment, when the electronic device 101 is in the unfolded state (the flat state) (e.g., FIG. 2), the first housing 210 and the second housing 220 may be disposed to form an angle of 180 degrees therebetween and to be oriented in the same direction. The surface of the first display area 231 and the surface of the second display area 232 of the display 230 may form 180 degrees therebetween and may oriented in the same direction (e.g., the front direction of the electronic device). The folding area 233 may define the same plane as the first display area 231 and the second display area 232.

According to an embodiment, when the electronic device 101 is in the folded state (e.g., FIG. 3), the first housing 210 and the second housing 220 may be disposed to face each other. The surface of the first display area 231 and the surface of the second display area 232 of the display 230 may face each other while forming a narrow angle (e.g., between 0 degrees and 10 degrees) therebetween. At least a portion of the folding area 233 may be provided as a curved surface having a predetermined curvature.

According to an embodiment, when the electronic device 101 is in the intermediate state (not illustrated), the first housing 210 and the second housing 220 may be disposed to form a certain angle therebetween. The surface of the first display area 231 and the surface of the second display area 232 of the display 230 may form an angle greater than that in the folded state and smaller than that in the unfolded state. At least a portion of the folding area 233 may form a curved surface having a predetermined curvature, and the curvature in this case may be smaller than that in the folded state.

FIG. 4 is an exploded perspective view of an electronic device according to various embodiments.

Referring to FIG. 4, the electronic device 101 may include a housing 201, a display 230, a hinge assembly 202, a battery 250, and a board unit 260. The housing 201 may include a first housing 210, a second housing 220, a first rear surface cover 280, and a second rear surface cover 290. The configuration of the first housing 210, the second housing 220, the hinge cover 240, the first rear surface cover 280, and the second rear surface cover 290 of FIG. 4 may be wholly or partly the same as the configuration of the first housing 210, the second housing 220, the hinge cover 240, the first rear surface cover 280, and the second rear surface cover 290 in FIG. 2 and/or FIG. 3.

According to an embodiment, the first housing 210 and the second housing 220 may be assembled to each other to be coupled to opposite sides of the hinge assembly 202. According to an embodiment, the first housing 210 may include a first support area 212 capable of supporting components (e.g., the first circuit board 262 and/or the first battery 252) of the electronic device 101 and a first side wall 211 surrounding at least a portion of the first support area 212. The first side wall 211 may include a first side surface (e.g., the first side surface 210c in FIG. 2) of the electronic device 101. According to an embodiment, the second housing 220 may include a first support area 222 capable of supporting components (e.g., the second circuit board 264 and/or the second battery 254) of the electronic device 101 and a second side wall 221 surrounding at least a portion of the second support area 222. The second side wall 221 may include a second side surface (e.g., the second side surface 220c in FIG. 2) of the electronic device 101.

According to an embodiment, the display 230 may include a first display area 231, a second display area 232, a folding area 233, and a sub-display 244. The configuration of the first display area 231, the second display area 232, and the folding area 233 in FIG. 3 may be wholly or partly the same as or similar to the configuration of the first display area 231, the second display area 232, and the folding area 233 in FIG. 1 and/or FIG. 2.

According to an embodiment, the sub-display 244 may display a screen in a different direction from the display areas 231 and 232. For example, the sub-display 234 may output a screen in a direction opposite to the first display area 231. According to an embodiment, the sub-display 234 may be disposed on the first rear surface cover 280.

According to an embodiment, the battery 250 may include a first battery 252 disposed in the first housing 210 and a second battery 254 disposed in the second housing 220. According to an embodiment, the first battery 252 may be connected to a first circuit board 262, and the second battery 254 may be connected to a second circuit board 264. According to an embodiment, the battery 250 may supply power to at least one component of the electronic device 101. According to an embodiment, the battery 250 may include, for example, a non-rechargeable primary cell, a rechargeable secondary cell, or a fuel cell.

According to an embodiment, the board unit 260 may include the first circuit board 262 disposed in the first housing 210 and the second circuit board 264 disposed in the second housing 220. According to an embodiment, the first circuit board 262 and the second circuit board 264 may be electrically connected to each other by at least one flexible circuit board 266. According to an embodiment, at least a portion of flexible circuit board 266 may be disposed across hinge assembly 202. According to an embodiment, the first circuit board 262 and the second circuit board 264 may be disposed in a space defined by the first housing 210, the second housing 220, the first rear surface cover 280, and the second rear surface cover 290. Components for implementing various functions of the electronic device 101 may be mounted on the first circuit board 262 and the second circuit board 264.

According to an embodiment, the electronic device 101 may include speakers 208a and 208b. According to an embodiment, the speakers 208*a* and 208*b* may convert electrical signals into sound. According to an embodiment, the speakers 208*a* and 208*b* may be disposed inside the space defined by the first housing 210, the second housing 220, the first rear surface cover 280, and the second rear surface cover 290. According to an embodiment, the speakers 208*a* and 208*b* may include an upper speaker 208*a* located in an upper portion (the +Y direction) of the electronic device 101 and a lower speaker 208*b* located in the lower portion (the −Y direction) of the electronic device 101. In the disclosure, the speakers 208*a* and 208*b* are illustrated as being located within one housing (e.g., the first housing 210 in FIG. 4), but this is an optional structure. For example, the speakers 208*a* and 208*b* may be located within at least one of the first housing 210 or the second housing 220. The configuration of the speakers 208*a* and 208*b* in FIG. 4 may be wholly or partly the same as the configuration of the sound output module 155 in FIG. 1.

According to an embodiment, the electronic device 101 may include a rear member 270 (or a rear case). According to an embodiment, the rear member 270 may be disposed within the housing 201 (e.g., the second housing 220). According to an embodiment, the rear member 270 may accommodate at least one antenna 275.

According to an embodiment, the electronic device 101 may include an antenna 275. The antennas 275*a* and 275*b* may include, for example, an ultrawide band (UWB) antenna 275*a*, a near field communication (NFC) antenna, a wireless charging antenna, and/or a magnetic secure transmission (MST) antenna 275*b*. For example, the antenna 275 may execute short-range communication with an external device or may transmit/receive power required for charging to/from an external device in a wireless manner.

In an embodiment, an antenna structure may be provided by portions of the housing 201 or a combination thereof. For example, the antenna 275 may include a communication antenna 275*c* that is at least partially exposed to the outside of the electronic device 101 and defines at least a portion of the outside of the electronic device 101. The communication antenna 275*c* may be used for communication (e.g., Wi-Fi) with an external electronic device. The communication antenna 275*c* may be connected to an upper portion 271*a* or a lower portion 271*b* of the rear member 270.

In the following detailed description, a pair of housings may be illustrated with respect to a configuration in which the housings are rotatably coupled to each other by a hinge structure. It is noted that an electronic device according to various embodiments disclosed herein is not limited. For example, an electronic device according to various embodiments disclosed herein may include three or more housings, and the "a pair of housings" in various example embodiments disclosed below may refer, for example, to "two housings rotatably coupled to each other among three or more housings".

Figure 5:
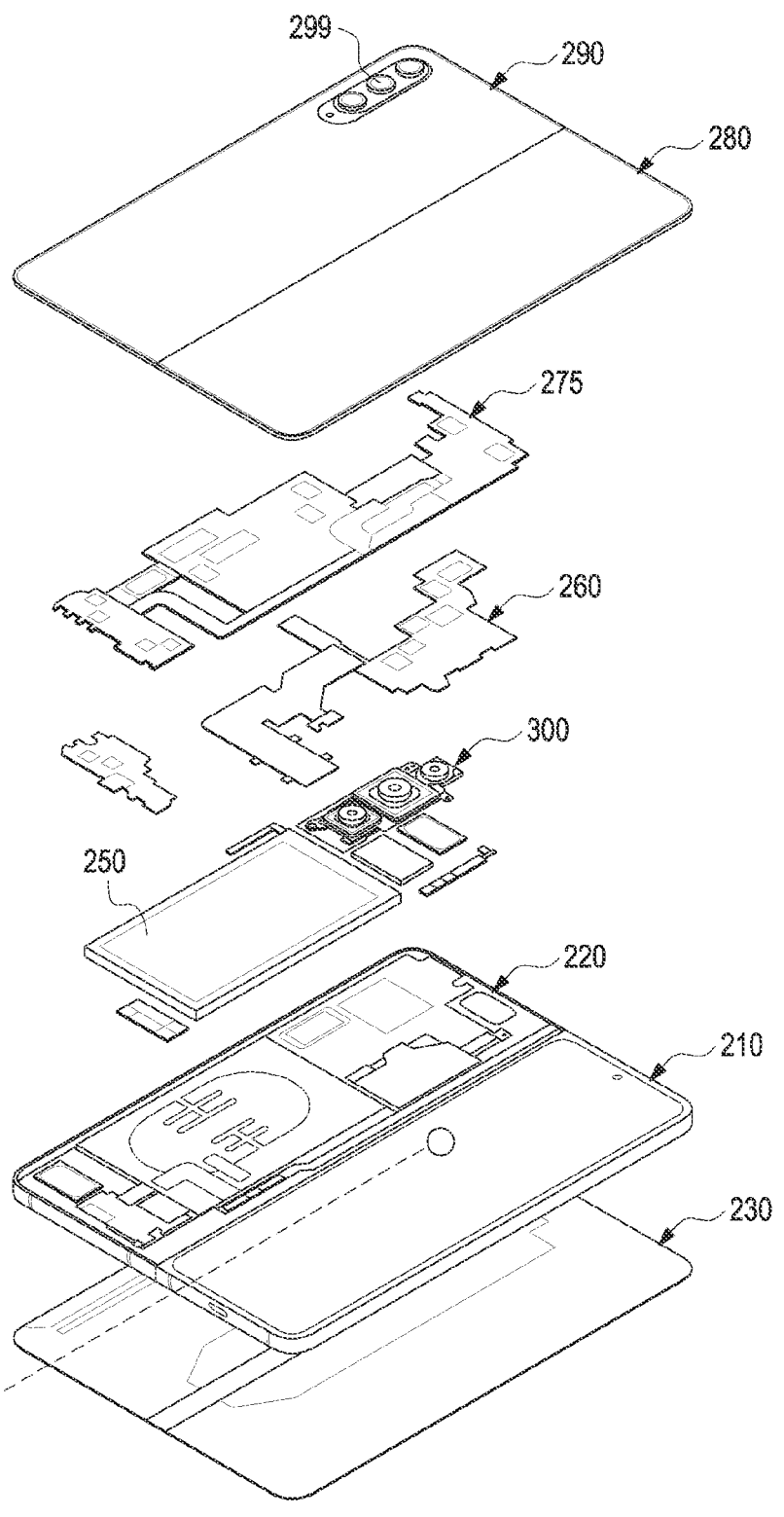
FIG. 5 is an exploded perspective view of an electronic device according to various embodiments.

FIG. 5 is an exploded perspective view of an electronic device 200 according to various embodiments. The components described with reference to FIG. 5 may be partly or wholly the same as the components described with reference to FIGS. 1 to 4. The components to be described with reference to FIG. 5 may be partly or wholly the same as the components to be described with reference to FIGS. 6 to 18.

According to an embodiment, the electronic device 200 may include a first housing 210, a second housing 220, a display 230, a battery 250, a board unit 260, a first rear surface cover 280, and a second rear surface cover 290. For description of the above-described components (e.g., the first housing 210, the second housing 220, the display 230, the battery 250, the substrate unit 260, the antenna 275, the first rear surface cover 280, and the second rear surface cover 290), the description of the components (e.g., the first housing 210, the second housing 220, the display 230, the battery 250, the board unit 260, the antenna 275, the first rear surface cover 280, and the second rear surface cover 290) with reference to FIG. 4 may be equally applicable.

According to an embodiment, the electronic device 200 may include a camera assembly 300. The camera assembly 300 may be disposed inside a housing (e.g., 201 in FIG. 4). The camera assembly 300 may receive light from the outside of the housing (e.g., 201 in FIG. 4). The light outside the housing (e.g., 201 in FIG. 4) may be projected into the camera assembly 300.

Figure 7A:
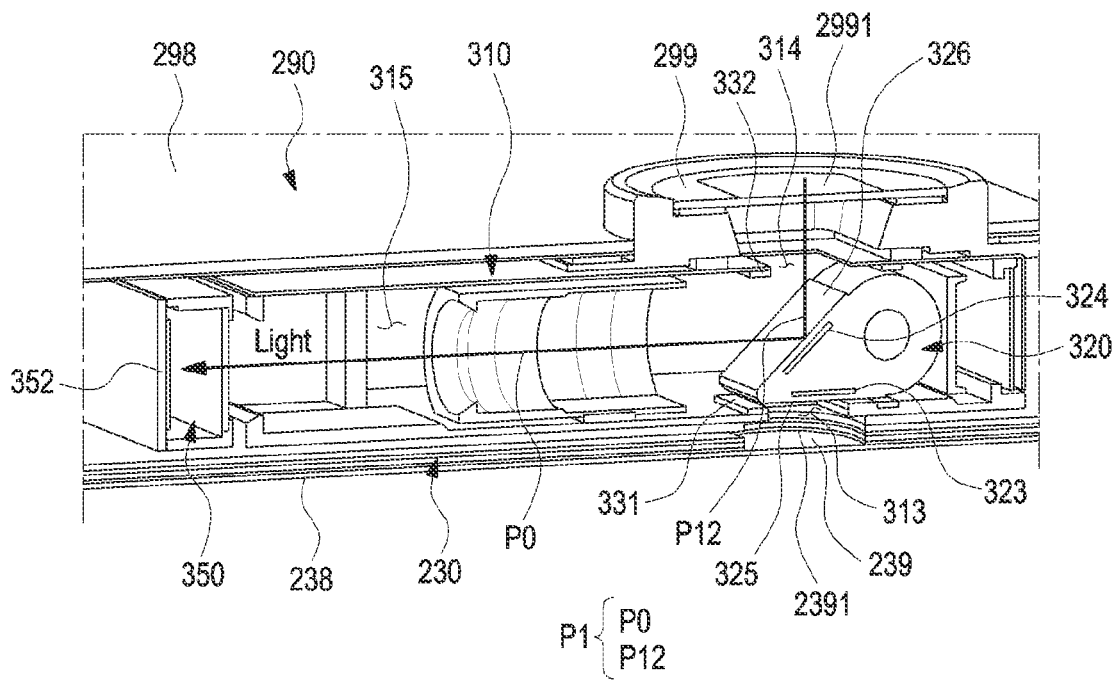
FIG. 7A is a partial cutaway perspective view illustrating a portion of the camera assembly according to various embodiments.
Figure 7B:
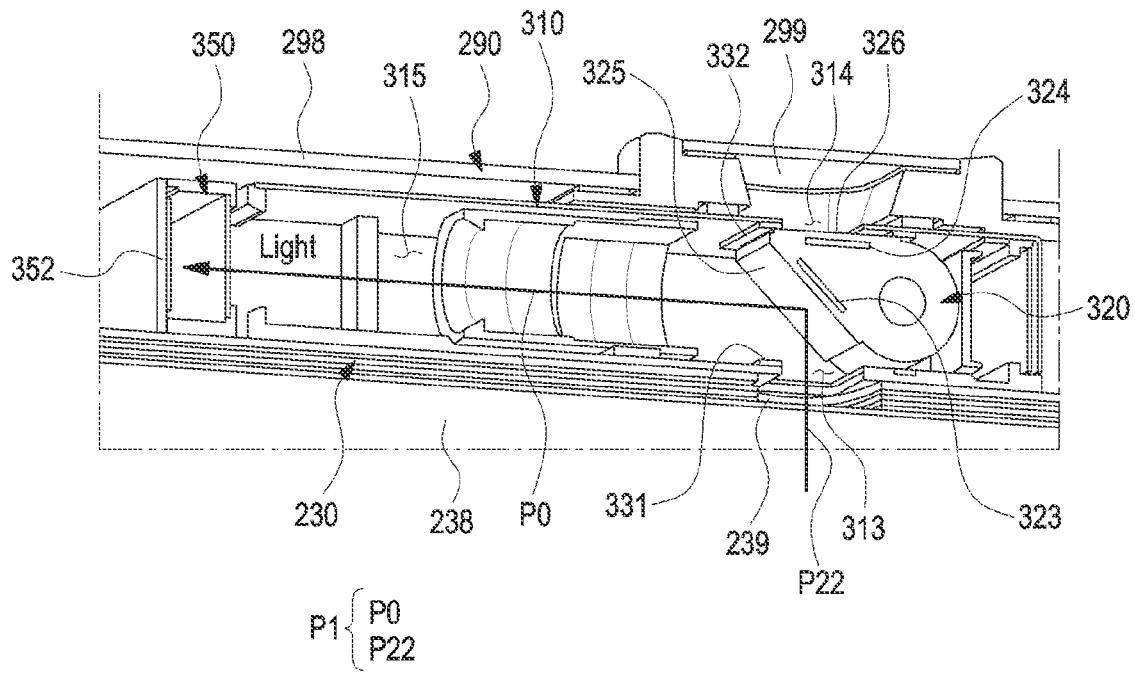
FIG. 7B is a partial cutaway perspective view illustrating a portion of the camera assembly according to various embodiments.

According to an embodiment, the display 230 may include a first projection hole 239 (see, e.g., FIGS. 7A and 7B). The first projection hole 239 may be opened toward the camera assembly 300. The light outside the housing (e.g., 201 in FIG. 4) may be projected into the camera assembly 300 through the first projection hole 239.

According to an embodiment, the housing (e.g., 201 in FIG. 4) may include a second projection hole 299. The second projection hole 299 may be opened in the second rear surface cover 290. The second projection hole 299 may be opened toward the camera assembly 300. The light outside the housing (e.g., 201 in FIG. 4) may be projected into the camera assembly 300 through the second projection hole 299.

Figure 6:
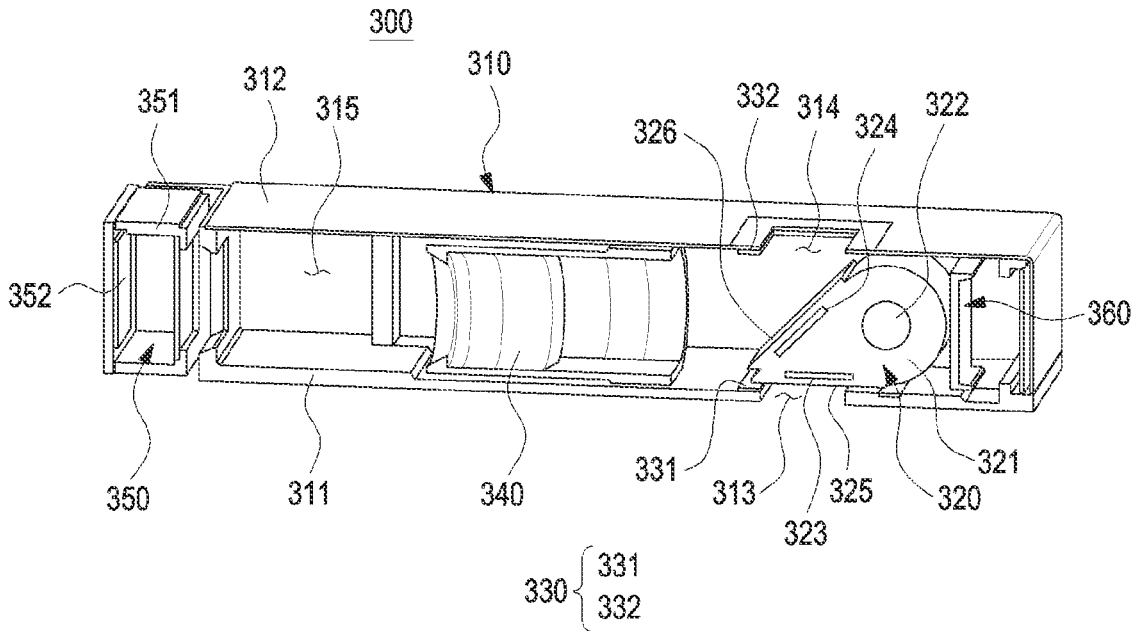
FIG. 6 is a partial cutaway perspective view of a camera assembly according to various embodiments.

FIG. 6 is a cutaway perspective view illustrating the camera assembly 300 cut away and viewed from an angle according to various embodiments. The components to be described with reference to FIG. 6 may be partly or wholly the same as the components described with reference to FIGS. 1 to 5. The components to be described with reference to FIG. 6 may be partly or wholly the same as the components to be described with reference to FIGS. 7A to 18.

According to an embodiment, the camera assembly 300 may include a case 310. Case 310 may have a space 315 therein. The light outside the case 310 may be projected into the space 315 of the case 310.

According to an embodiment, the case 310 may include a first wall 311. The first wall 311 may extend in the direction in which light propagates inside the case 310. The case 310 may include a second wall 312. The second wall 312 may extend in the direction in which light propagates inside the case 310. The first wall 311 and the second wall 312 may be spaced apart from each other. The space 315 inside the case 310 may be defined between the first wall 311 and the second wall 312.

According to an embodiment, the case 310 may include a first camera hole 313. The first camera hole 313 may be opened in the first wall 311. The first camera hole 313 may be connected to the space 315. The light outside the case 310 may be projected into the space 315 through the first camera hole 313. The case 310 may include a second camera hole 314. The second camera hole 314 may be opened in the second wall 312. The second camera hole 314 may be connected to the space 315. The light outside the case 310 may be projected into the space 315 through the second camera hole 314. The first camera hole 313 and the second camera hole 314 may be located at positions facing each other with a space 315 interposed therebetween.

According to an embodiment, the camera assembly 300 may include a rotary body 320. The rotary body 320 may be rotatably disposed inside the case 310. The rotary body 320 may be disposed between the first wall 311 and the second wall 312. The rotary body 320 may be rotated between the first camera hole 313 and the second camera hole 314.

According to an embodiment, the rotary body 320 may include a body 321. The body 321 may form the outer shape of the rotary body 320. The body 321 may be rotatably disposed inside the case 310. The body 321 may have the shape of a cam.

According to an embodiment, the rotary body 320 may include a rotary shaft 322. The rotary shaft 322 may be coupled to the body 321. The rotary shaft 322 may be rotatably disposed inside the case 310. The camera assembly 300 may include a support block 360. The support block 360 may be disposed inside the case 310. The rotary shaft 322 may be rotatably coupled to the support block 360.

According to an embodiment, the rotary body 320 may include a first magnetic body 323. The first magnetic body 323 may be disposed inside the body 321. The body 321 may have a space inside which the first magnetic body 323 is disposed. The first magnetic body 323 may be moved toward the first camera hole 313 or may be moved in a direction away from the first camera hole 313.

According to an embodiment, the rotary body 320 may include a second magnetic body 324. The second magnetic body 324 may be disposed inside the body 321. The body 321 may have a space inside which the second magnetic body 324 is disposed. The second magnetic body 324 may be moved toward the second camera hole 314 or may be moved in a direction away from the second camera hole 314.

According to an embodiment, the rotary body 320 may include a first reflective surface 325. The first reflective surface 325 may be exposed to the outside of the body 321. The first reflective surface 325 may define the outer surface of the body 321. The first reflective surface 325 may be provided at a position corresponding to the first magnetic body 323. The first reflective surface 325 may be moved toward the first camera hole 313 or may be moved in a direction away from the first camera hole 313. The first reflective surface 325 may be moved toward the first camera hole 313 to close the first camera hole 313. The light projected through the first camera hole 313 may be reflected on the first reflective surface 325 and projected into the space 315. The first reflective surface 325 may change the path of the light projected through the first camera hole 313.

According to an embodiment, the rotary body 320 may include a second reflective surface 326. The second reflective surface 326 may be exposed to the outside of the body 321. The second reflective surface 326 may define the outer surface of the body 321. The second reflective surface 326 may be provided at a position corresponding to the second magnetic body 324. The second reflective surface 326 may be moved toward the second camera hole 314 or may be moved in a direction away from the second camera hole 314. The second reflective surface 326 may be moved toward the second camera hole 314 to close the second camera hole 314. The light projected through the second camera hole 314 may be reflected on the second reflective surface 326 and projected into the space 315. The second reflective surface 326 can change the path of the light projected through the second camera hole 314.

According to an embodiment, the camera assembly 300 may include a coil 330. The coil 330 may be coupled to the first wall 311 or the second wall 312. The coil 330 may generate a magnetic field by receiving current. The coil 330 may generate magnetic force in the magnetic bodies 323 and 324. The magnetic bodies 323 and 324 may move toward the coil 330 by attractive force with the coil 330. The magnetic bodies 323 and 324 may move in a direction away from the coil 330 by repulsive force with the coil 330.

According to an embodiment, the coil 330 may include a first coil 331. The first coil 331 may be coupled to the first wall 311. The first coil 331 may be arranged to surround at least a portion of the first camera hole 313. The first coil 331 may generate a magnetic field by receiving current. The first coil 331 may face the first reflective surface 325. The first coil 331 may generate magnetic force in the first magnetic body 323.

According to an embodiment, the coil 330 may include a second coil 332. The second coil 332 may be coupled to the second wall 312. The second coil 332 may be arranged to surround at least a portion of the second camera hole 314. The second coil 332 may generate a magnetic field by receiving current. The second coil 332 may face the second reflective surface 326. The second coil 332 may generate magnetic force in the second magnetic body 324.

Figure 13A:
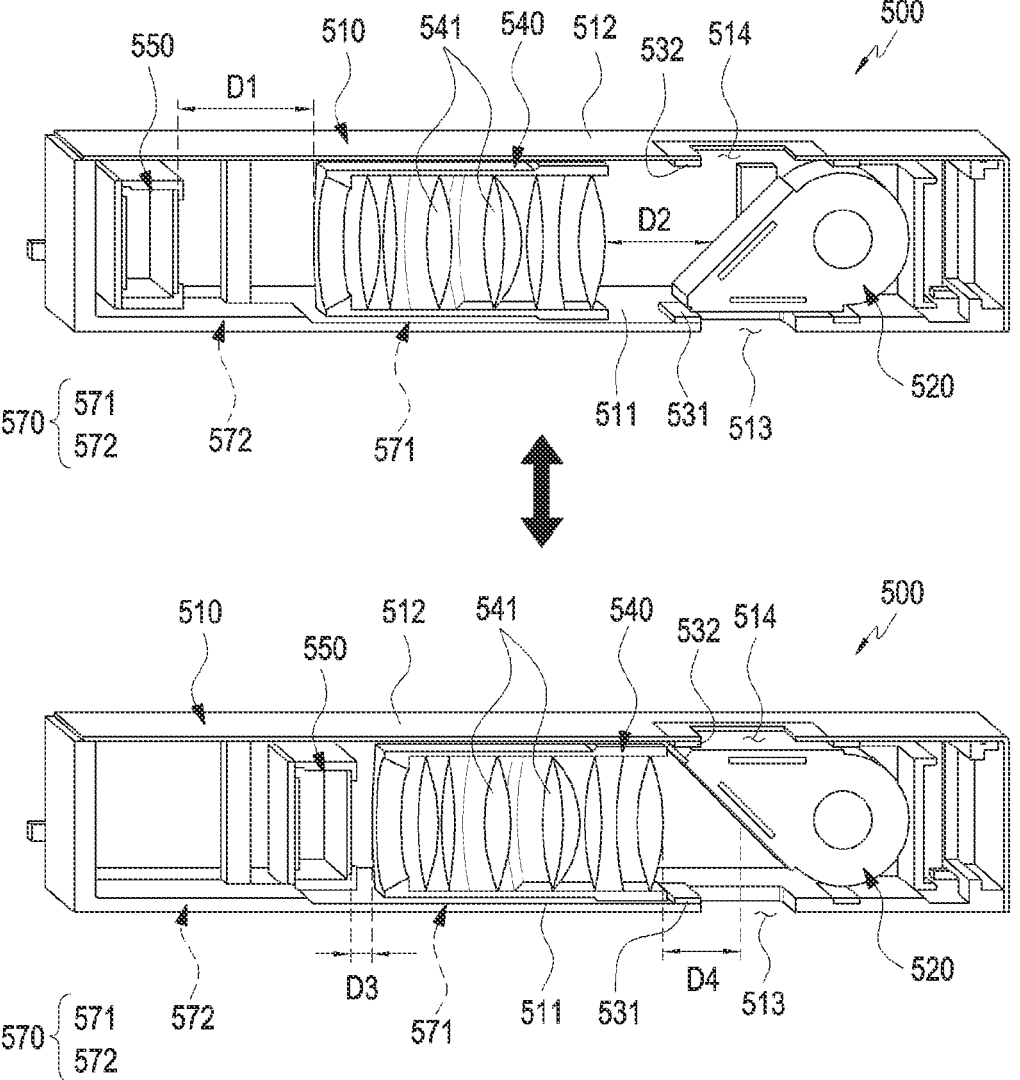
FIG. 13A is a cutaway perspective view of a camera assembly according to various embodiments.

According to an embodiment, the camera assembly 300 may include a lens barrel 340. The lens barrel 340 may be arranged inside the case 310. The light projected into the case 310 may pass through the inner space of the lens barrel 340. Inside the lens barrel 340, as illustrated in FIG. 13A, a lens (e.g., the lenses 541 in FIG. 13A) may be arranged.

According to an embodiment, the camera assembly 300 may include an image sensor assembly 350. The image sensor assembly 350 may be coupled with the case 310. The light projected into the case 310 through the first and second camera holes 313 and 314 may be reflected from the reflective surfaces 325 and 326 and projected toward the image sensor assembly 350. The image sensor assembly 350 is capable of receiving light projected into the case 310.

According to an embodiment, the image sensor assembly 350 may include an image sensor housing 351. The image sensor housing 351 may have a space therein. The image sensor housing 351 may be coupled with the case 310. The image sensor assembly 350 may include an image sensor 352. The image sensor 352 may be arranged inside the image sensor housing 351. The image sensor 352 is capable of receiving light projected into the case 310.

FIG. 7A is a partial cutaway perspective view illustrating the housing (e.g., 201 in FIG. 4) and the camera assembly 300 when the rotary body 320 is moved toward the first camera hole 313 according to various embodiments. FIG. 7B is a partial cutaway perspective view illustrating the housing (e.g., 201 in FIG. 4) and the camera assembly 300 when the rotary body 320 is moved toward the second camera hole 314 according to various embodiments. The components to be described with reference to FIGS. 7A and 7B may be partly or wholly the same as the components described with reference to FIGS. 1 to 6. The components to be described with reference to FIGS. 7A and 7B may be partly or wholly the same as the components to be described with reference to FIGS. 8A to 18.

According to an embodiment, the case 310 may be dispose inside a housing (e.g., 201 in FIG. 4) and may face the display 230. The first wall 311 of the case 310 may face the display 230. The second wall 312 of the case 310 may face the second rear surface cover 290. The display 230 may include a first surface 238. The first surface 238 may define one surface (e.g., the front surface) of an electronic device (e.g., 200 in FIG. 5). The second rear surface cover 290 may include a second surface 298. The second surface 298 may define the other surface (e.g., the rear surface) of the electronic device (e.g., 200 in FIG. 5). The first wall 311 of the case 310 may be disposed at a position corresponding to the first surface 238. The second wall 312 of the case 310 may be disposed at a position corresponding to the second surface 298.

According to an embodiment, the first projection hole 239 may face the first camera hole 313. The first projection hole 239 may be connected to the first camera hole 313. The light outside the electronic device (e.g., 200 in FIG. 5) may be projected into the case 310 through the first projection hole 239 and the first camera hole 313. The electronic device 200 may include a front lens 2391. The front lens 2391 may be arranged in the first projection hole 239. The light outside the electronic device (e.g., 200 in FIG. 5) may pass through the front lens 2391.

According to an embodiment, the second projection hole 299 may face the second camera hole 314. The second projection hole 299 may be connected to the second camera hole 314. The light outside the electronic device (e.g., 200 in FIG. 5) may be projected into the case 310 through the second projection hole 299 and the second camera hole 314. The electronic device 200 may include a rear lens 2991. The rear lens 2991 may be disposed in the second projection hole 299. The light outside the electronic device (e.g., 200 in FIG. 5) may pass through the rear lens 2991.

Referring to FIG. 7A, the rotary body 320 may move toward the first wall 311. The rotary body 320 may close the first camera hole 313. The first reflective surface 325 may be coupled with the first coil 331 and may close the first camera hole 313. The light passing through the first projection hole 239 may be reflected from the first reflective surface 325 to the outside of the electronic device (e.g., 200 in FIG. 5). The light passing through the first projection hole 239 may not be projected into the case 310. The first coil 331 may generate attractive force on the first magnetic body 323. Current may be applied to the first coil 331 so that attractive force is generated between the first coil 331 and the first magnetic body 323. The second coil 332 may generate repulsive force on the second magnetic body 324. Current may be applied to the second coil 332 so that repulsive force is generated between the second coil 332 and the second magnetic body 324. The rotary body 320 may move toward the first wall 311 by the attractive force and the repulsive force. An optical path P1 may be provided inside the camera assembly 300. The optical path P1 may be a path along which light propagates. The optical path P1 may include a reflected light path P0. The light reflected from the second reflective surface 326 may propagate toward the image sensor 352 along the reflected light path P0. The optical path P1 may include a first incident light path P12. The light passing through the second camera hole 314 may propagate toward the second reflective surface 326 along the first incident light path P12.

Referring to FIG. 7B, the rotary body 320 may move toward the second wall 312. The rotary body 320 may close the second camera hole 314. The second reflective surface 326 may be coupled with the second coil 332 and may close the second camera hole 314. The light passing through the second projection hole 299 may be reflected from the second reflective surface 326 to the outside of the electronic device (e.g., 200 in FIG. 5). The light passing through the second projection hole 299 may not be projected into the case 310. The second coil 332 may generate attractive force on the second magnetic body 324. Current may be applied to the second coil 332 so that attractive force is generated between the second coil 332 and the second magnetic body 324. The first coil 331 may generate repulsive force on the first magnetic body 323. Current may be applied to the first coil 331 so that repulsive force is generated between the first coil 331 and the first magnetic body 323. The rotary body 320 may move toward the second wall 312 by the attractive force and the repulsive force. An optical path P2 may be provided inside the camera assembly 300. The optical path P2 may be a path along which light propagates. The optical path P2 may include a reflected light path P0. The light reflected from the first reflective surface 325 may propagate toward the image sensor 352 along the reflected light path P0. The optical path P2 may include a second incident light path P22. The light passing through the first camera hole 313 may propagate toward the first reflective surface 325 along the second incident light path P22.

According to an embodiment, the magnetic force generated between the coils 331 and 332 and the magnetic bodies 323 and 324 may be generated due to the direction of the current flowing in the coils 331 and 332 and the magnetic field generated thereby. For example, the coils 331 and 332 may extend to at least partially surround the camera holes 313 and 314, and the magnetic field direction (first direction) when the current flows clockwise along the extension direction of the coils 331 and 332 and the magnetic field direction (second direction) when the current flowing counterclockwise may be opposite to each other. For example, when the current flows clockwise along the extension direction of the coils 331 and 332, the first magnetic field direction may be toward the second camera hole 314 from the first camera hole 313, and when the current flows counterclockwise along the extension direction of the coils 331 and 332, the second magnetic field direction may be toward the first camera hole 313 from the second camera hole 314. For example, when the direction of the magnetic field generated by the coils 331 and 332 is the first magnetic field direction, attractive force may be generated between the coils 331 and 332 and the magnetic bodies 323 and 324, and when the direction of the magnetic field generated by the coils 331 and 332 is the second magnetic field direction, repulsive force may be generated between the coils 331 and 332 and the magnetic bodies 323 and 324.

Figure 8A:
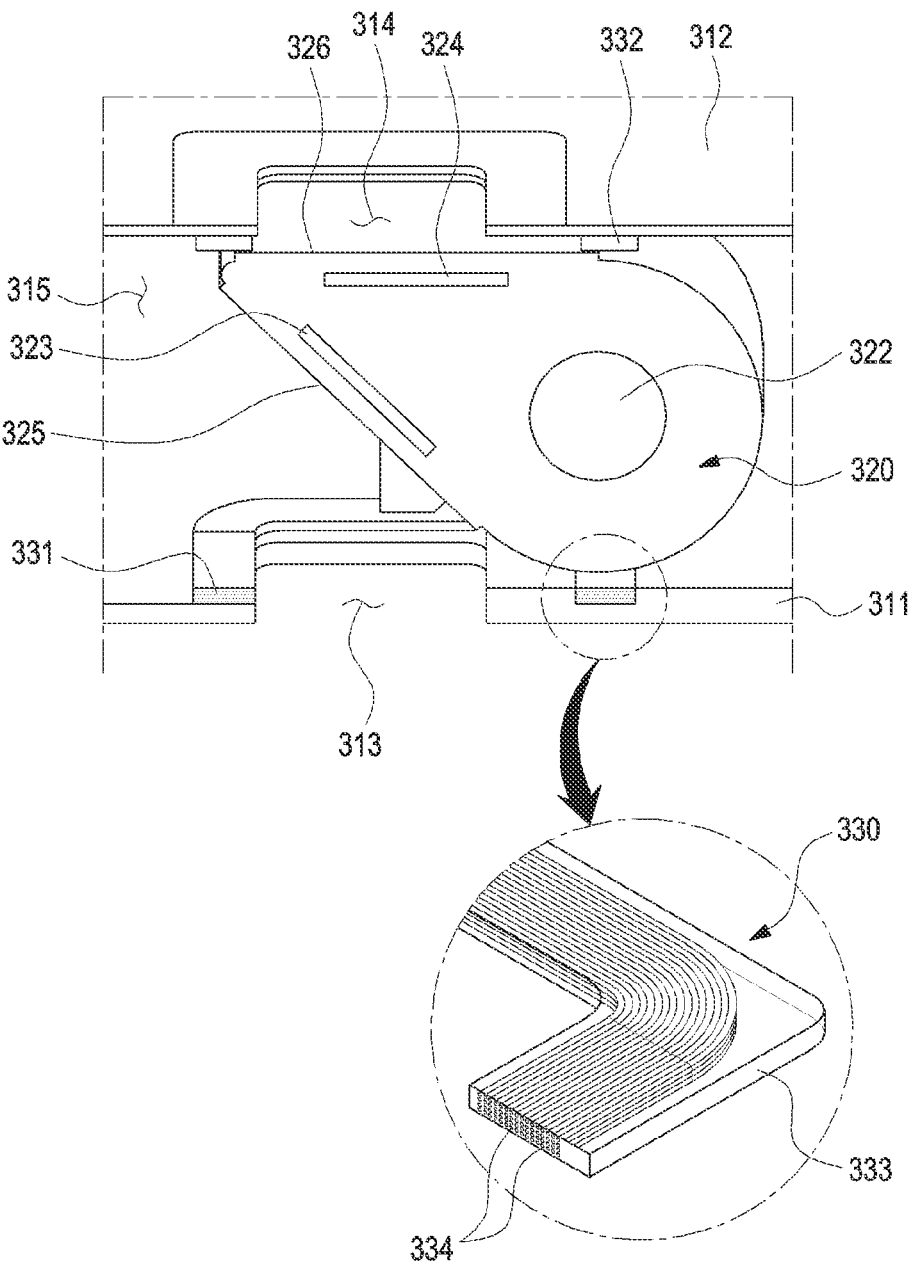
FIG. 8A is a cross-sectional view illustrating a portion of the camera assembly according to various embodiments.
Figure 8B:
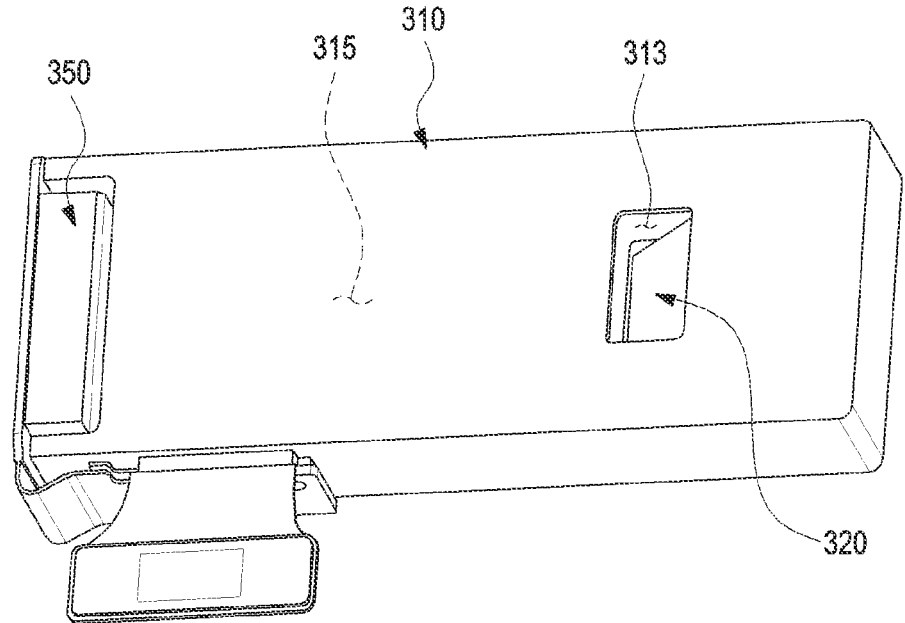
FIG. 8B is a perspective view illustrating a portion of the camera assembly according to various embodiments.

FIG. 8A is a partial perspective view including an enlarged view of a portion of the camera assembly 300 in the state of FIG. 7B according to various embodiments. FIG. 8B is a perspective view illustrating the camera assembly 300 in which some structures are omitted in the state of FIG. 7B according to various embodiments. The components to be described with reference to FIGS. 8A and 8B may be partly or wholly the same as the components described with reference to FIGS. 1 to 7B. The components to be described with reference to FIGS. 8A and 8B may be partly or wholly the same as the components to be described with reference to FIGS. 9 to 18.

According to an embodiment, the rotary body 320 may be rotated toward the second wall 312. Attractive force may occur between the second coil 332 and the second magnetic body 324. The second reflective surface 326 may close the second camera hole 314. The second reflective surface 326 may be in contact with the second coil 332.

According to an embodiment, the rotary body 320 may be rotated in a direction away from the first wall 311. Repulsive force may occur between the first coil 331 and the first magnetic body 323. The first reflective surface 325 may be spaced apart from the first camera hole 313. The first reflective surface 325 may be spaced apart from the first coil 331. The light outside the camera assembly 300 may be projected into the space 315 through the first camera hole 313.

According to an embodiment, the coil 330 may include a plurality of winding bodies 334. The plurality of winding bodies 334 may extend along the perimeters of the camera holes 313 and 314. The coil 330 may include a buffer member 333. The buffer member 333 may include an extendible or contractable material. The buffer member 333 may surround the plurality of winding bodies 334. The buffer member 333 may be in contact with the reflective surfaces 325 and 326. The buffer member 333 may support the reflective surfaces 325 and 326 and may seal the spaces between the reflective surfaces 325 and 326 and the coil 330.

According to an embodiment, the rotary body 320 may open the first camera hole 313, and the light outside the case 310 may be projected into the space 315 through the first camera hole 313. The light passing through the first camera hole 313 may be reflected from the first reflective surface 325 to propagate toward the image sensor assembly 350.

Figure 9:
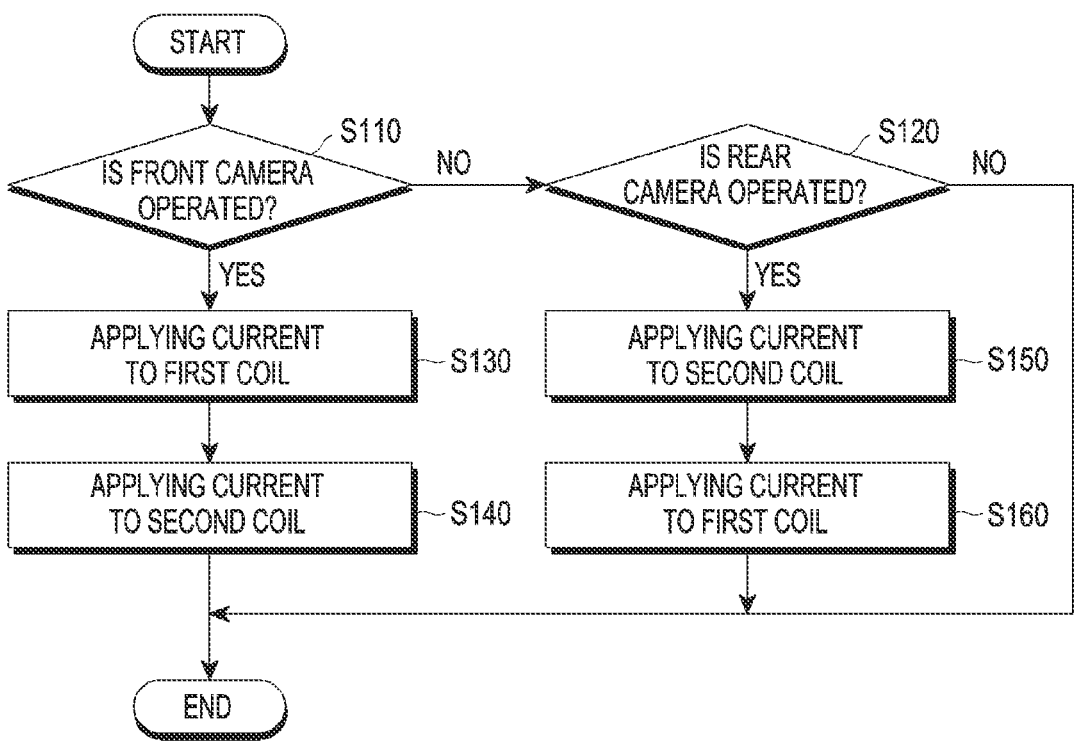
FIG. 9 is a flowchart illustrating an example operation of the camera assembly according to various embodiments.

FIG. 9 is a flowchart illustrating an example operation of a camera assembly (e.g., 300 in FIG. 6) according to various embodiments. The components to be described with reference to FIG. 9 may be partly or wholly the same as the components described with reference to FIGS. 1 to 8B. The components to be described with reference to FIG. 9 may be partly or wholly the same as the components to be described with reference to FIGS. 10 to 18.

Referring to FIGS. 6 to 9, the camera assembly 300 may be driven in a first mode or a second mode. The first mode may be a mode in which the first camera hole 313 is opened and the second camera hole 314 is closed. The second mode may be a mode in which the first camera hole 313 is closed and the second camera hole 314 is opened. The first mode may be called a "front camera operation mode". The second mode may be called a "rear camera operation mode". When the camera assembly 300 operates in the first mode (S110), current may be applied to the first coil 331 to generate repulsive force with the first magnetic body 323 (S130). When the camera assembly 300 operates in the second mode (S110), current may be applied to the second coil 332 to generate attractive force with the second magnetic body 324 (S140). When the camera assembly 300 operates in the second mode (S120), current may be applicable to the second coil 332 to generate repulsive force with the second magnetic body 324 (S150). When the camera assembly 300 operates in the second mode (S120), current may be applicable to the first coil 331 to generate attractive force with the first magnetic body 323 (S160).

Figure 10:
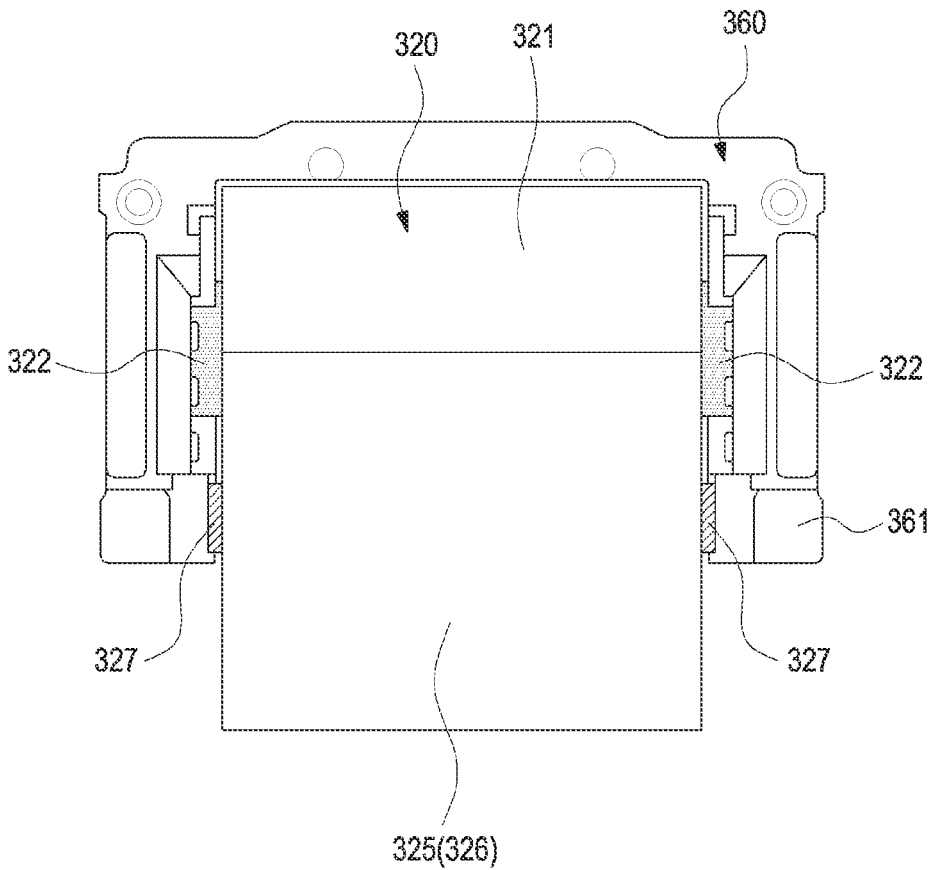
FIG. 10 is a diagram illustrating a portion of a camera assembly according to various embodiments.
Figure 11:
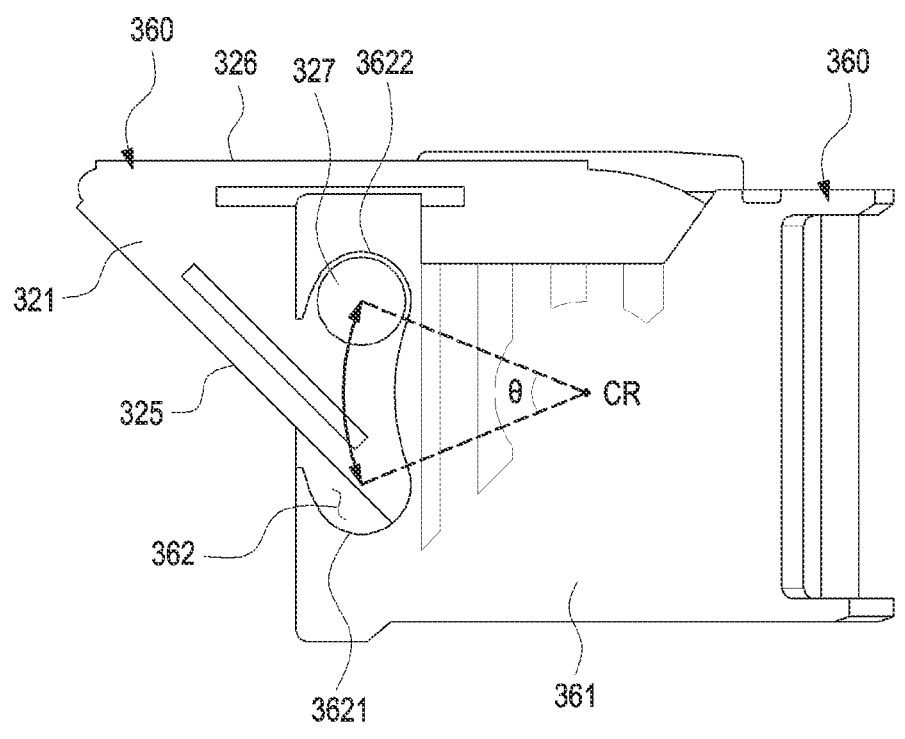
FIG. 11 is a cross-sectional view illustrating a portion of the camera assembly according to various embodiments.

FIG. 10 is a diagram illustrating the rotary body 320 and the support block 360 which are separated from each other according to various embodiments. FIG. 11 is a cross-sectional view illustrating the structure in FIG. 10 according to various embodiments. The components to be described with reference to FIGS. 10 and 11 may be partly or wholly the same as the components described with reference to FIGS. 1 to 9. The components to be described with reference to FIGS. 10 and 11 may be partly or wholly the same as the components to be described with reference to FIGS. 12 to 18.

According to an embodiment, the rotary body 320 may rotate around the rotary shaft 322. The reflective surfaces 325 and 326 may define a portion of the outer surface of the body 321. The rotary body 320 may include a stopper 327. The stopper 327 may protrude from the body 321 toward the support block 360.

According to an embodiment, the support block 360 may be coupled with the rotary body 320. The rotary body 320 may be rotatably coupled to the support block 360. The support block 360 may include a block body 361. The block body 361 may extend to surround at least a portion of the rotary body 320. The stopper 327 may protrude toward the block body 361.

According to an embodiment, the support block 360 may include a slit 362. The slit 362 may extend in an arc shape. The slit 362 may be opened in the block body 361. The stopper 327 of the rotary body 320 may be placed inside the slit 362. The stopper 327 may be moved inside the slit 362. The slit 362 may include a first edge 3621 and a second edge 3622. The slit 362 may extend in an arc shape between the first edge 3621 and the second edge 3622. The stopper 327 may be moved between the first edge 3621 and the second edge 3622 of the slit 362. The stopper 327 may be engaged with the block body 361 at the first edge 3621 and the second edge 3622. The rotation angle of the rotary body 320 may be limited by the stopper 327 and the slit 362. For example, the rotary body 320 may be moved within an angular range θ over which the slit 362 extends around the rotation center CR. The rotation center CR of the rotary body 320 may coincide with the rotary shaft 322. The slit 362 may extend in an arc shape at a position spaced apart from the rotation center CR, and may form a central angle θ around the rotation center CR.

Figure 12:
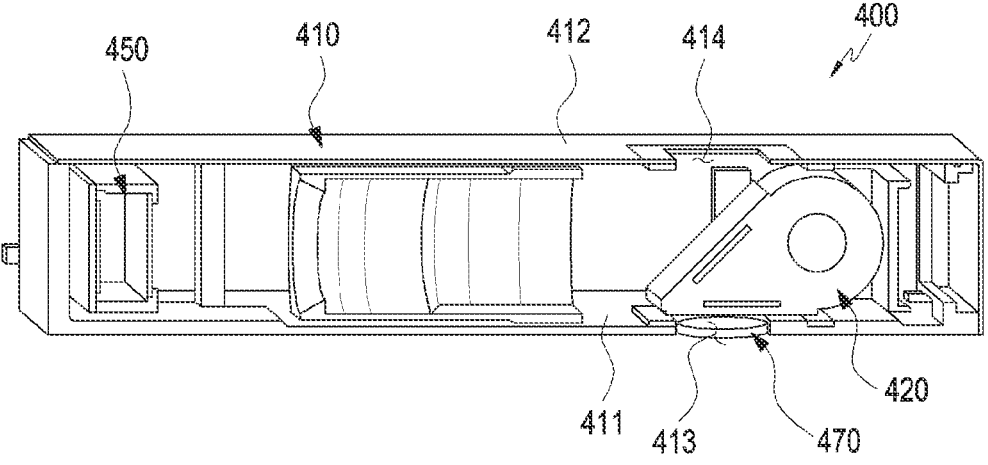
FIG. 12 is a cutaway perspective view of the camera assembly according to various embodiments.

FIG. 12 is a partial cutaway perspective view of a camera assembly 400 according to various embodiments. The components to be described with reference to FIG. 12 may be partly or wholly the same as the components to be described with reference to FIGS. 1 to 11. The components to be described with reference to FIG. 12 may be partly or wholly the same as the components to be described with reference to FIGS. 13A to 18.

According to an embodiment, the camera assembly 400 may include a case 410, a rotary body 420, and an image sensor assembly 450. The descriptions of the components (e.g., the case 310, the rotary body 320, and the image sensor assembly 350) described with reference to FIGS. 1 to 11 may be equally applicable to the above-mentioned components (e.g., the case 410, the rotary body 420, and the image sensor assembly 450).

According to an embodiment, the case 410 may include a first wall 411, a second wall 412, a first camera hole 413, and a second camera hole 414. The descriptions of the components (e.g., the first wall 311, the second wall 312, the first camera hole 313, and the second camera hole 314) described with reference to FIGS. 1 to 11 may be equally applicable to the above-mentioned components (e.g., the first wall 411, the second wall 412, the first camera hole 413, and the second camera hole 414).

According to an embodiment, the camera assembly 400 may include a lens 470. The lens 470 may be placed in the first camera hole 413. The lens 470 may be coupled to the first wall 411. The light projected through the first camera hole 413 may pass through the lens 470. The light passing through the lens 470 may be refracted. In the camera assembly 400 according to an embodiment of the disclosure, when the lens 470 is selectively disposed only in the first camera hole 413 among the first camera hole 413 and the second camera hole 414, the angle of view formed when light is projected through the first camera hole 413 and the angle of view when light is projected through the second camera hole 414 may be different from each other.

Figure 13B:
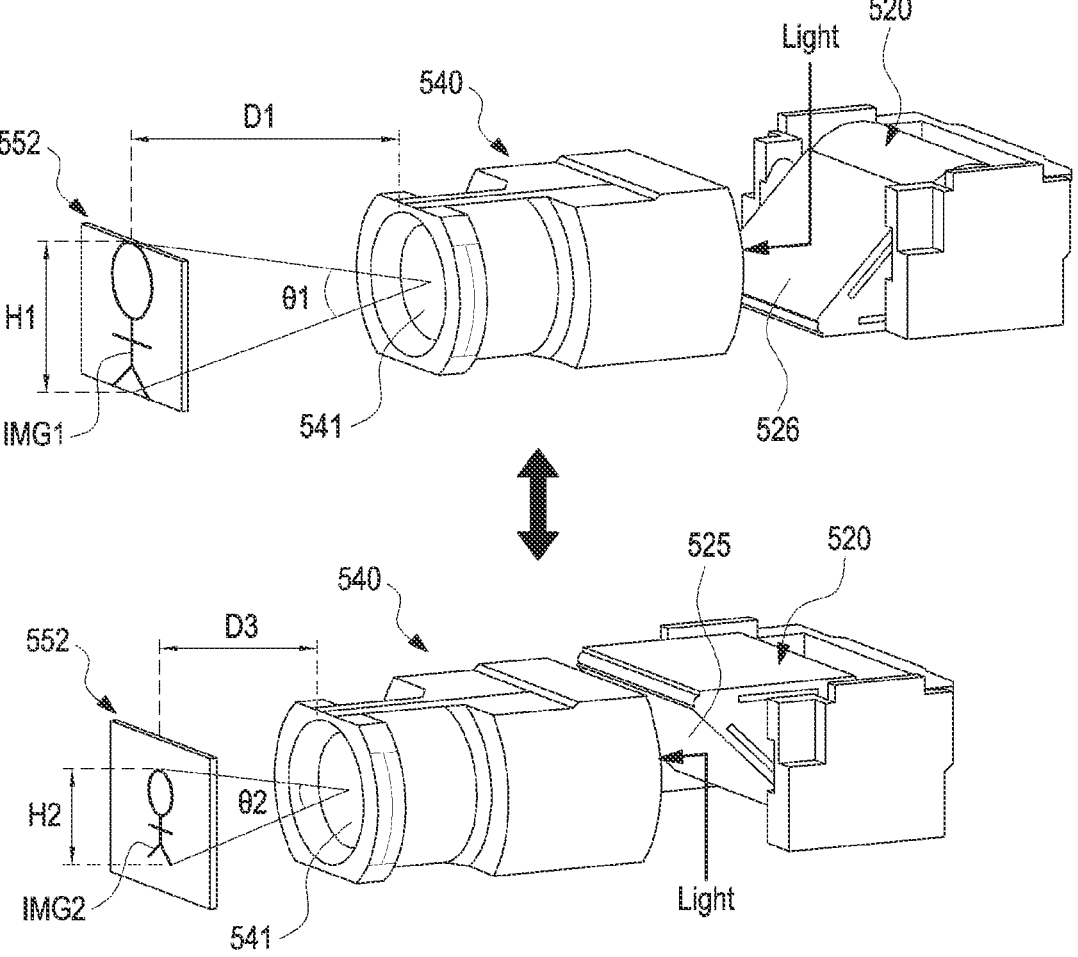
FIG. 13B is a perspective view illustrating a portion of a camera assembly according to various embodiments.
Figure 13C:
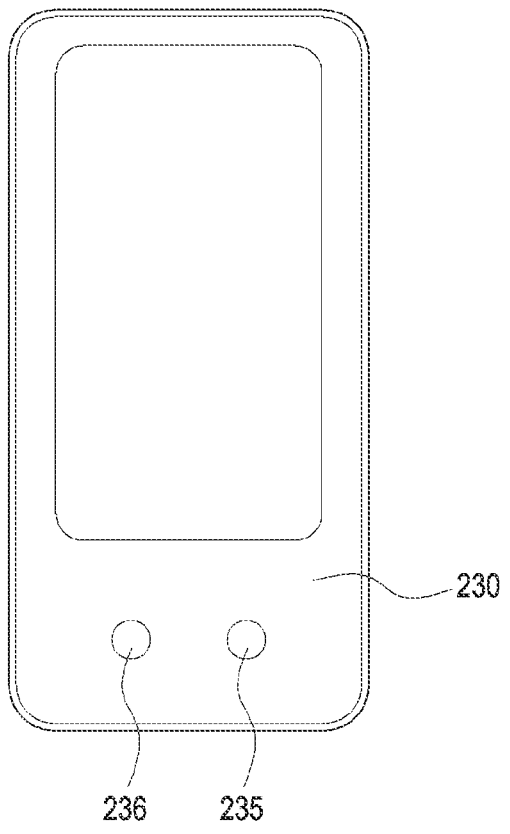
FIG. 13C is a diagram illustrating the front surface of a display according to various embodiments.
Figure 14:
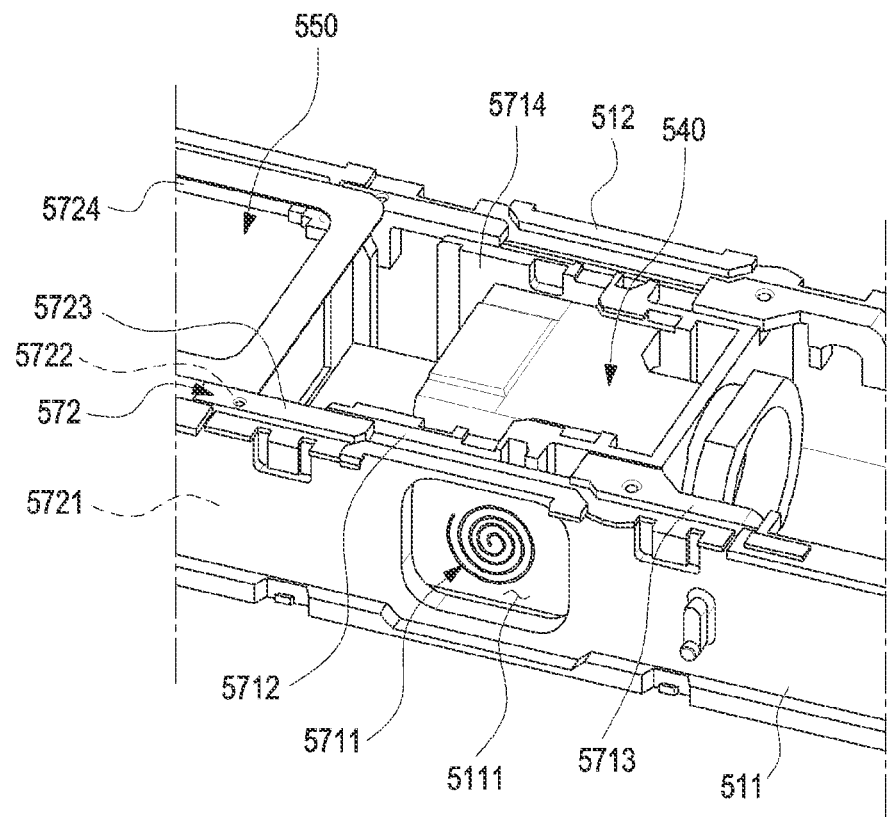
FIG. 14 is a partial perspective view illustrating a portion of a camera assembly according to various embodiments.
Figure 15:
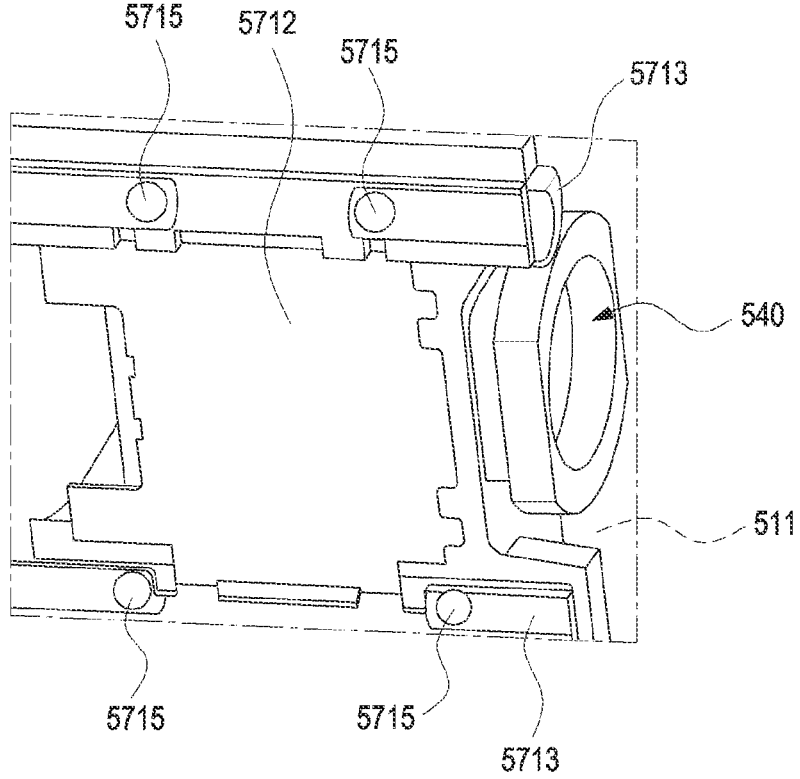
FIG. 15 is a partial perspective view illustrating a portion of the camera assembly according to various embodiments.

FIG. 13A is a partial cutaway perspective view of a camera assembly 500 according to various embodiments. FIG. 13B is a partial cutaway perspective view illustrating the arrangement of a rotary body 520, a lens barrel 540, a lens 541, and an image sensor 552 according to various embodiments. FIG. 13C is a diagram illustrating the display 230 when capturing an image through the camera assembly 500 according to various embodiments. FIG. 14 is a partial cutaway enlarged perspective view of the camera assembly 500 illustrated in FIG. 13A according to various embodiments. FIG. 15 is a partial perspective view of a portion of the camera assembly 500 illustrated in FIG. 13A according to various embodiments. The components to be described with reference to FIGS. 13A to 15 may be partly or wholly the same as the components described with reference to FIGS. 1 to 12. The components to be described with reference to FIGS. 13A to 15 may be partly or wholly the same as the components to be described with reference to FIGS. 16 to 18.

According to an embodiment, the camera assembly 500 may include a case 510, a rotary body 520, a first coil 531, a second coil 532, a lens barrel 540, and an image sensor assembly 550. The descriptions of the components (e.g., the case 310, the rotary body 320, the first coil 331, the second coil 332, the lens barrel 340, and the image sensor assembly 350) described with reference to FIGS. 1 to 12 may be equally applicable to the above-mentioned components (e.g., the case 510, the rotary body 520, the first coil 531, the second coil 532, the lens barrel 540, and the image sensor assembly 550).

According to an embodiment, the case 510 may include a first wall 511, a second wall 512, a first camera hole 513, and a second camera hole 514. The descriptions of the components (e.g., the first wall 311, the second wall 312, the first camera hole 313, and the second camera hole 314) described with reference to FIGS. 1 to 12 may be equally applicable to the above-mentioned components (e.g., the first wall 511, the second wall 512, the first camera hole 513, and the second camera hole 514).

According to an embodiment, the camera assembly 500 may include a lens 541. The lens 541 may be placed inside the lens barrel 540. A plurality of lenses 541 may be arranged. The plurality of lenses 541 may be arranged between the rotary body 520 and the image sensor assembly 550. The lenses 541 may refract the light reflected by the rotary body 520.

According to an embodiment, the camera assembly 500 may include an actuator 570. The actuator 570 may move the lens barrel 540. The actuator 570 may move the image sensor assembly 550. The actuator 570 may include a first actuator 571 that moves the lens barrel 540. The actuator 570 may include a second actuator 572 that moves the image sensor assembly 550. The first actuator 571 and the second actuator 572 may include the same components and may move another structure (e.g., the lens barrel 540 or the image sensor assembly 550) according to the same principle. The description of the first actuator 571 may be equally applicable to the second actuator 572. The first actuator 571 and the second actuator 572 may be coupled to the first wall 511. However, the first wall 511 may have a space therein, and the first and second actuators 571 and 572 may be disposed in a space provided inside the first wall 511.

According to an embodiment, the lens barrel 540 and the image sensor assembly 550 may move within the case 510. The distance (e.g., D2 or D4) between the lens barrel 540 and the rotary body 520 may be variable by moving the lens barrel 540. The distance (e.g., D1 or D3) between the image sensor assembly 550 and the lens barrel 540 may be variable by moving the lens barrel 540 and the image sensor assembly 550. For example, the first distance D1 between the lens barrel 540 and the image sensor assembly 550 when the rotary body 520 closes the first camera hole 513 and opens the second camera hole 514 (which may be called, for example, a "first state") may be greater than the third distance D3 between the lens barrel 540 and the image sensor assembly 550 when the rotary body 520 opens the first camera hole 513 and closes the second camera hole 514 (which may be called, for example, a "second state"). For example, the second distance D2 between the lens barrel 540 and the rotary body 520 when the rotary body 520 closes the first camera hole 513 and opens the second camera hole 514 (which may be called, for example, a "first state") may be greater than the fourth distance D4 between the lens barrel 540 and the rotary body 520 when the rotary body 520 opens the first camera hole 513 and closes the second camera hole 514 (which may be called, for example, a "second state"). For each of the first state in which light is projected through the first camera hole 513 and the second state in which light is projected through the second camera hole, the camera assembly 500 according to an embodiment of the disclosure may differently adjust the above-mentioned distances (e.g., the first interval D1, the second interval D2, the third interval D3, and the fourth interval D4) to change the angles of view in the first state and the second state to be different from each other. The first actuator 571 may move the lens barrel 540, and a plurality of lenses 541 may be arranged inside the lens barrel 540. The first actuator 571 may move all of the plurality of lenses 541 together with the lens barrel 540, or may move only some of the plurality of lenses 541 together with the lens barrel 540.

For example, referring to FIGS. 13A and 13B, the size of the image IMG1 or IMG2 formed on the image sensor 552 and the angle of view θ1 or θ2 between the lens 541 and the image sensor 552 may vary depending on the distance D1 or D3 between the 540 and the image sensor 552. For example, the distance D1 between the lens barrel 540 and the image sensor 552 when light is projected through the second camera hole 514 may be greater than the distance D3 between the lens barrel 540 and the image sensor 552 when light is projected through the first camera hole 513. For example, the angle of view θ1 formed between the lens 541 and the image sensor 552 when light is projected through the second camera hole 514 may be smaller than the angle of view θ2 formed between the lens 541 and the image sensor 552 when light is projected through the first camera hole 513. For example, the size H1 of the image IMG1 formed on the image sensor 552 when light is projected through the second camera hole 514 may be greater than the size H2 of the image IMG2 formed on the image sensor 552 when light projected through the first camera hole 513. In the camera assembly 500 according to an embodiment of the disclosure, the size H1 or H2 of the image IMG1 or IMG2 formed on the image sensor 552 and the angle of view θ1 or θ2 between the lens 541 and the image sensor 552 may be adjusted by adjusting the distance (e.g., D1 or D3) between the lens barrel 540 and the image sensor 552.

According to an embodiment, when capturing an image of a subject through the camera assembly 500, a screen (user interface) may be output on the display 230 as illustrated in FIG. 13C. The display 230 may include a first button 235 and a second button 236. The user may press either the first button 235 or the second button 236 on the display 230. When the user presses the first button 235, the camera assembly 500 may be driven in a state in which the first camera hole 513 is closed and light is received through the second camera hole 514 (e.g., the state illustrated in the upper portion of FIG. 13A). When the user presses the first button 235, the rotary body 520 may move to close the first camera hole 513, and the lens barrel 540 and the image sensor 552 may move to have a first angle of view θ1 (e.g., the state illustrated at the top of FIG. 13B). When the user presses the second button 236, the camera assembly 500 may be driven in a state in which the second camera hole 514 is closed and light is received through the first camera hole 513 (e.g., the state illustrated at the bottom of FIG. 13A). When the user presses the second button 236, the rotary body 520 may move to close the second camera hole 514, and the lens barrel 540 and the image sensor 552 may move to have a second angle of view θ2 (e.g., the state illustrated at the bottom of FIG. 13B).

According to an embodiment, the lens barrel 540 may be movably disposed between the first wall 511 and the second wall 512. The first actuator 571 may include a first actuating coil 5711. The first actuating coil 5711 may be disposed in an accommodation space 5111 formed in the first wall 511. The first actuating coil 5711 may receive current and form a magnetic field based on the received current.

According to an embodiment, the first actuator 571 may include a first magnet 5712. The first magnet 5712 may be disposed between the lens barrel 540 and the first wall 511. The first magnet 5712 may be moved together with the lens barrel 540. The first magnet 5712 may be moved by the magnetic field formed by the first actuating coil 5711. Magnetic force may be formed between the first actuating coil 5711 and the first magnet 5712.

According to an embodiment, the first actuator 571 may include a $(1-1)^{th}$ slider 5713. The $(1-1)^{th}$ slider 5713 may be disposed between the lens barrel 540 and the first wall 511. The $(1-1)^{th}$ slider 5713 may be moved together with the lens barrel 540. The first magnet 5712 may be coupled to the $(1-1)^{th}$ slider 5713.

According to an embodiment, the first actuator 571 may include a $(1-2)^{th}$ slider 5714. The $(1-2)^{th}$ slider 5714 may be disposed between the lens barrel 540 and the second wall 512. The $(1-2)^{th}$ slider 5714 may be moved together with the lens barrel 540.

According to an embodiment, the image sensor assembly 550 may be movably disposed between the first wall 511 and the second wall 512. The second actuator 572 may move the image sensor assembly 550, and the principle by which the second actuator 572 moves the image sensor assembly 550 may be the same as the principle by which the first actuator 571 moves the lens barrel 540. The second actuator 572 may include the same components as the first actuator 571 (e.g., an actuating coil 5721, a magnet 5722, a first slider 5723, and a second slider 5724).

According to an embodiment, the second actuator 572 may include a second actuating coil 5721. The second actuating coil 5721 may be disposed in an accommodation space 5111 formed in the first wall 511. The second actuating coil 5721 may receive current and form a magnetic field based on the received current.

According to an embodiment, the second actuator 572 may include a second magnet 5722. The second magnet 5722 may be disposed between the image sensor assembly 550 and the first wall 511. The second magnet 5722 may be moved together with the image sensor assembly 550. The second magnet 5722 may be moved by a magnetic field formed by the second actuating coil 5721. Magnetic force may be formed between the second actuating coil 5721 and the second magnet 5722.

According to an embodiment, the second actuator 572 may include a $(2-1)^{th}$ slider 5723. The $(2-1)^{th}$ magnet 5723 may be disposed between the image sensor assembly 550 and the first wall 511. The $(2-1)^{th}$ slider 5723 may be moved together with the image sensor assembly 550. The first magnet 5722 may be coupled to the $(2-1)^{th}$ slider 5723.

According to an embodiment, the second actuator 572 may include a $(2-2)^{th}$ slider 5724. The $(2-2)^{th}$ magnet 5724 may be disposed between the image sensor assembly 550 and the second wall 512. The $(2-2)^{th}$ slider 5724 may be moved together with the image sensor assembly 550.

According to an embodiment, the first actuator 571 may include a first roller 5715. The first roller 5715 may be rotatably disposed between the $(1-1)^{th}$ slider 5713 and the first wall 511. The first roller 5715 may rotate between the $(1-1)^{th}$ slider 5713 and the first wall 511 when the lens barrel 540 moves. The first roller 5715 may support the lens barrel 540, the $(1-1)^{th}$ slider 5713, and the first magnet 5712. A plurality of first rollers 5715 may be disposed. Although not illustrated in FIG. 15, the first roller 5715 may also be disposed between the $(1-2)^{th}$ slider 5714 and the second wall 512. The second actuator 572 may include a second roller (not illustrated) disposed between the second sliders 5723 and 5724 and the case 510. The description of the second roller (not illustrated) may be equally applicable to the first roller 5715.

According to an embodiment, the actuator 570 may include a first actuator 571 and a second actuator 572. Each of the first and second actuators 571 and 572 may be called an "actuator". Each of the first actuating coil 5711 and the second actuating coil 5721 may be called a "actuating coil". Each of the first magnet 5712 and the second magnet 5722 may be called a "magnet". Each of the $(1-1)^{th}$ slider 5713, the $(1-2)^{th}$ slider 5714, the $(2-1)^{th}$ slider 5723, and the $(2-2)^{th}$ slider 5724 may be called a "slider".

Figure 16:
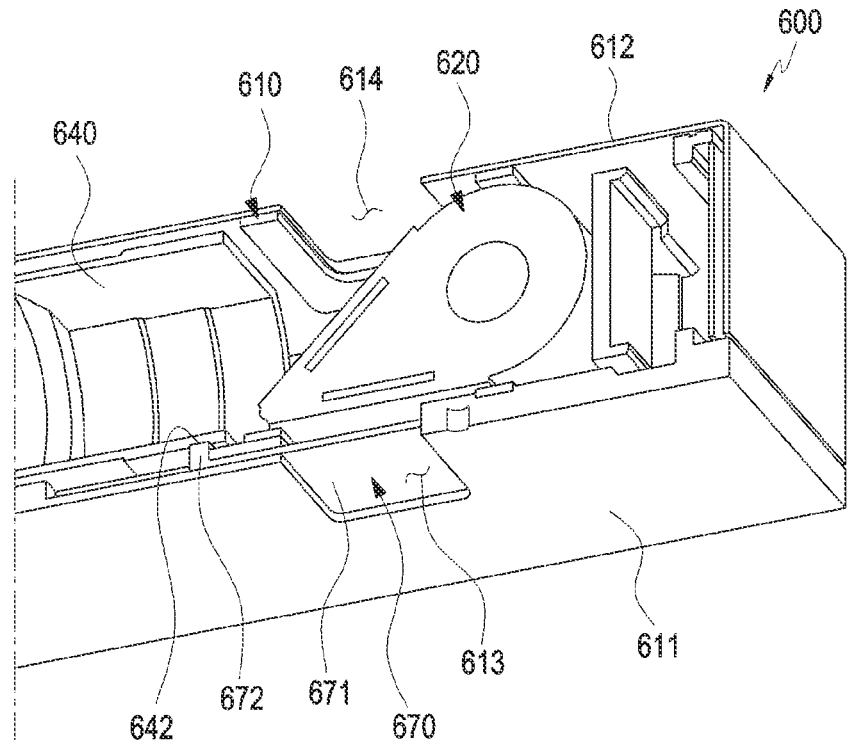
FIG. 16 is a partial view illustrating a portion of the camera assembly according to various embodiments.

FIG. 16 is a partial cutaway perspective view of a camera assembly 600 according to various embodiments. The components to be described with reference to FIG. 16 may be partly or wholly the same as the components described with reference to FIGS. 1 to 15. The components to be described with reference to FIG. 16 may be partly or wholly the same as the components to be described with reference to FIGS. 17A to 18.

According to an embodiment, the camera assembly 600 may include a case 610, a rotary body 620, and a lens barrel 640. The descriptions of the components (e.g., the case 310 or 510, the rotary body 320 or 520, and the lens barrel 340 or 540) described with reference to FIGS. 1 to 15 may be equally applicable to the above-mentioned components (e.g., the case 610, the rotary body 620, and the lens barrel 640).

According to an embodiment, the case 610 may include a first wall 611, a second wall 612, a first camera hole 613, and a second camera hole 614. The descriptions of the components (e.g., the first wall 311 or 511, the second wall 312 or 512, the first camera hole 313 or 513, and the second camera hole 314 or 514) described with reference to FIGS. 1 to 15 may be equally applicable to the above-mentioned components (e.g., the first wall 611, the second wall 612, the first camera hole 613, and the second camera hole 614).

According to an embodiment, the camera assembly 600 may include a shield plate 670. The shield plate 670 may open and close the first camera hole 613. The shield plate 670 may close the first camera hole 613 when the rotary body 620 moves toward the first camera hole 613. The shield plate 670 may open the first camera hole 613 when the rotary body 620 moves in a direction away from the first camera hole 613. The first camera hole 613 may face a display (e.g., the display 230 in FIG. 4), and the light output from the display (e.g., the display 230 in FIG. 4) may be reflected and projected into the case 610 through the first camera hole 613. The camera assembly 600 according to an embodiment of the disclosure closes the first camera hole 613 with the shield plate 670 when the rotary body 620 moves toward the first camera hole 613, thereby reducing an image quality problem caused when the light reflected from the display (e.g., the display 230 in FIG. 4) is projected into the case 610.

According to an embodiment, the shield plate 670 may move together with the lens barrel 640. The shield plate 670 may include a plate 671. The plate 671 may be disposed to be movable with respect to the first wall 611 along the extending direction of the first wall 611. The plate 671 may open and close the first camera hole 613. The shield plate 670 may include a locking portion 672. The locking portion 672 may protrude from the plate 671 toward the lens barrel 640. the lens barrel 640 may include a fixing portion 642. The locking portion 672 may be inserted into and fixed to the fixing portion 642. The lens barrel 640 may be moved by the same principle as the principle described with reference to FIGS. 13A to 15 (for example, the principle by which the lens barrel 540 is moved by the first actuator 571). The camera assembly 600 according to an embodiment of the disclosure may include the first actuator 571 illustrated in FIGS. 13A to 15.

Figure 17A:
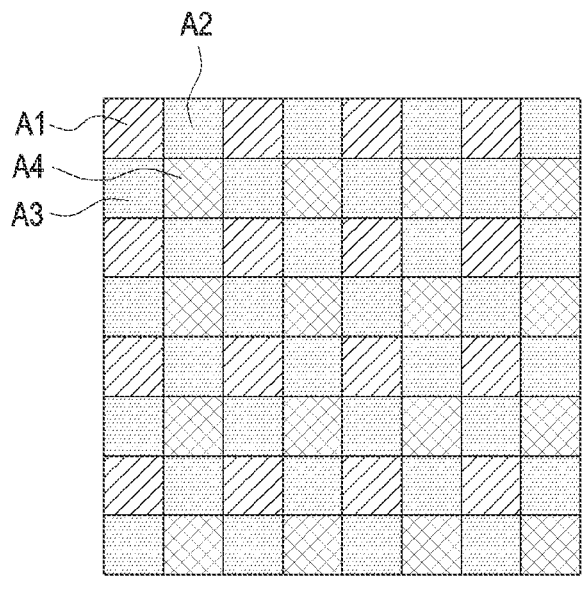
FIG. 17A is a diagram illustrating pixel binning of a camera assembly according to various embodiments.
Figure 17B:
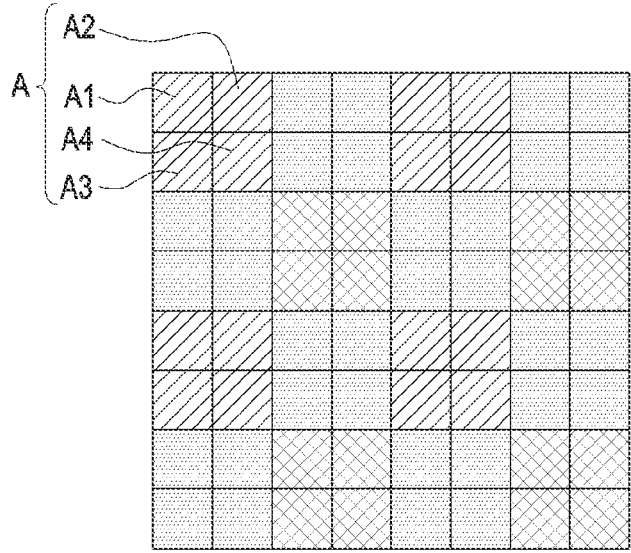
FIG. 17B is a diagram illustrating pixel binning of the camera assembly according to various embodiments.

FIG. 17A is a diagram illustrating an example arrangement of pixels of an image sensor (e.g., the image sensor 352 in FIG. 6) according to various embodiments. FIG. 17B is a diagram illustrating an example arrangement of pixels of an image sensor (e.g., the image sensor 352 in FIG. 6) according to various embodiments. The components to be described with reference to FIGS. 17A and 17B may be partly or wholly the same as the components described with reference to FIGS. 1 to 16.

Pixel binning technology may be applied to the camera assembly (e.g., the camera assembly 300, 400, 500, or 600) of FIGS. 1 to 16 according to various embodiments of the disclosure. For example, when the first camera hole (e.g., 313 in FIG. 7A) is closed and the second camera hole (e.g., 314 in FIG. 7A) is opened by rotating the rotary body (e.g., 320 in FIG. 7A), the pixels of the image sensor (e.g., 352 in FIG. 7A) may be arranged in the same form as in FIG. 17A. For example, when the first camera hole (e.g., 313 in FIG. 7B) is opened and the second camera hole (e.g., 314 in FIG. 7B) is closed by rotating the rotary body (e.g., 320 in FIG. 7B), the pixels of the image sensor (e.g., 352 in FIG. 7B) may be arranged in the same form as in FIG. 17B. When light is projected through the first camera hole (e.g., 313 in FIG. 7B) facing the display (e.g., 230 in FIG. 4), the camera assembly (e.g., the camera assembly 300, 400, 500, or 600 in FIGS. 1 to 16) according to various embodiments of the disclosure may use a plurality of pixels A1, A2, A3, and A4 as a single pixel group A, and when light is projected through the second camera hole (e.g., 314 in FIG. 7), the camera assembly may use each of the plurality of pixels A1, A2, A3, and A4 separately and divisionally. As described above, when the light passing through the display (e.g., 230 in FIG. 4) is received through the first camera hole (e.g., 320 in FIGS. 7A and 7B) by changing the arrangement of pixels depending on the rotation of the rotary body (e.g., 320 in FIGS. 7A and 7B), image quality deterioration due to reduced light quantity may be reduced using a pixel group A. As described above, when light is received through the second camera hole (e.g., 314 in FIG. 7A) by changing the arrangement of pixels depending on the rotation of the rotary body (e.g., 320 in FIGS. 7A and 7B), high-pixel image quality may be used by divisionally using each of the plurality of pixels A1, A2, A3, and A4.

Figure 18:
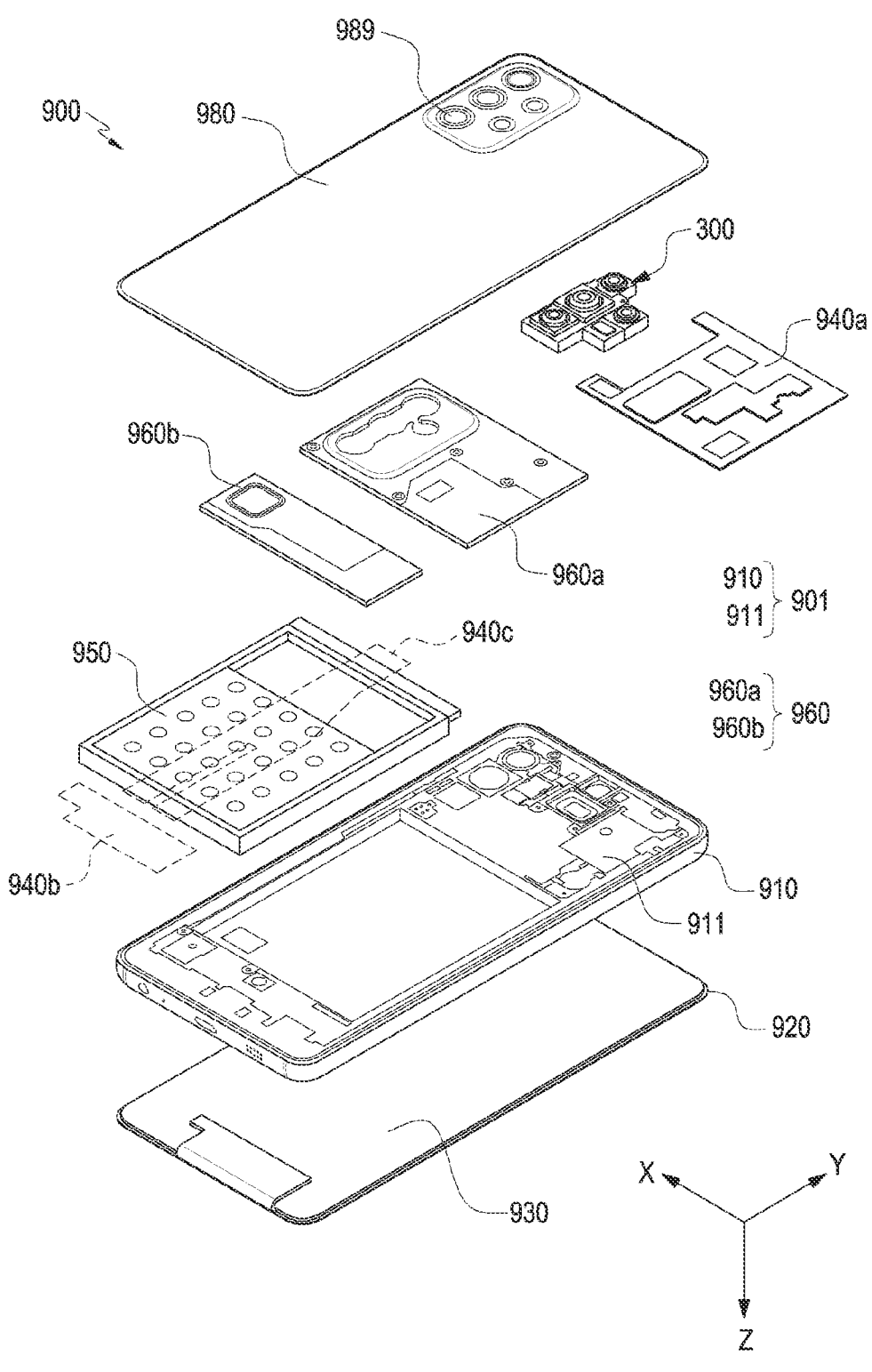
FIG. 18 is an exploded perspective view of the electronic device according to various embodiments.

FIG. 18 is an exploded perspective view of an electronic device 900 according to various embodiments. The components to be described with reference to FIG. 18 may be partly or wholly the same as the components described with reference to FIGS. 1 to 17B.

According to an embodiment, the electronic device 900 may include a housing 901 including a side surface structure 910 and a first support member 911 (e.g., a bracket), a front surface plate 920, a display 930, at least one printed circuit board (or a board assembly) 940a and 940b, a battery 950, a second support member 960 (e.g., a rear case), and a rear surface plate 980.

According to an embodiment, the electronic device 900 may include a first circuit board 940a disposed above the battery 950, a second circuit board 940b disposed below the battery 950, and a third circuit board 940c that electrically interconnects the first circuit board 940a and the second circuit board 940b.

According to an embodiment, the display 930 may be coupled to one surface of the first support member 911, and the circuit boards 940a and 940b may be coupled to the other surface of the first support member 911. The side surface structure 910 may define the peripheral surface of the first support member 911, and a portion thereof may include an antenna.

According to an embodiment, the housing 901 can accommodate the printed circuit boards 940a and 940b and the battery 950. The housing 901 may be understood to include the side surface structure 910, the front surface plate 920, and/or the rear surface plate 980.

According to an embodiment, the second support member 960 may include an upper support member 960a and a lower support member 960b. The upper support member 960a may be disposed to surround the printed circuit board 940a together with a portion of the first support member 911. The lower support member 960b may be disposed to face the first support member 911 with the second circuit board 940b interposed therebetween.

According to an embodiment, the battery 950 may be disposed inside the housing 901. The battery 950 may be seated on the first support member 911.

According to an embodiment, the electronic device 900 may include a camera assembly 300. The description of the camera assembly (e.g., the camera assembly 300, 400, 500, or 600) according to various embodiments described with reference to FIGS. 1 to 17B may be applicable to the camera assembly 300.

According to an embodiment, the rear surface plate 980 may include a second projection hole 989. The light outside the housing 901 may be projected into the camera assembly 300 through the second projection hole 989.

The electronic device includes a camera device for capturing an image of a subject outside the device. The electronic device may include a first surface defined by the display and a second surface opposite to the first surface, and the camera device is disposed between the first surface and the second surface. An electronic device according to a comparative example includes a plurality of camera devices which are arranged for each of subject image capturing through the first surface and subject image capturing through the second surface, whereby the number of components increases, and the space occupied by the camera devices in the electronic device increases.

The disclosure may enable subject images to be captured through the first and second surfaces of an electronic device using a single camera assembly.

The disclosure may provide different angles of view for capturing a subject image through the first surface and capturing a subject image through the second surface, respectively.

The problems addressed by the disclosure are not limited to the above-mentioned problems and may expand in various ways without departing from the spirit and scope of the disclosure.

The electronic device according to various embodiments of the disclosure includes a rotary body which is arranged to rotate between the first and second surfaces to selectively open and close the first and second camera holes, whereby it is possible to capture subject images through first and second surfaces using a single assembly.

The electronic device according to various embodiments of the disclosure includes the lens barrel and the image sensor assembly which are arranged inside the case to be movable, whereby it is possible to adjust the angles of view of subjects of which the images are respectively captured through the first and second surfaces to be different.

The effects that are capable of being obtained by the disclosure are not limited to those described above, and other effects not described above may be clearly understood by one of ordinary skill in the art to which the disclosure belongs based on the following description.

An electronic device (e.g., 200 in FIG. 4) according to an example embodiment of the disclosure may include a display (e.g., 230 in FIG. 7A) that defines a first surface (e.g., 238 in FIG. 7A) of the electronic device.

The electronic device (e.g., 200 in FIG. 4) according to an example embodiment of the disclosure may include a housing including (e.g., 201 in FIG. 4) a second surface (e.g., 298 in FIG. 7A) of the electronic device spaced apart from the first surface (e.g., 238 in FIG. 7A).

The electronic device (e.g., 200 in FIG. 4) according to an example embodiment of the disclosure may include a camera assembly (e.g., 300, 400, 500, or 600 in FIGS. 5 to 18) at least partially disposed between the first surface (e.g., 238 in FIG. 7A) and the second surface (e.g., 298 in FIG. 7A).

The camera assembly (e.g., 300, 400, 500, or 600 in FIGS. 5 to 18) according to an example embodiment of the disclosure may include a case (e.g., 310, 410, 510, or 610 in FIGS. 5 to 18) including a first camera hole (e.g., 313; 413, 513, or 613 in FIGS. 5 to 18) opened toward the first surface (e.g., 238 in FIG. 7A) and a second camera hole (e.g., 314, 414, 514, or 614 in FIGS. 5 to 18) opened toward the second surface (e.g., 298 in FIG. 7A).

The camera assembly (e.g., 300, 400. 500, or 600 in FIGS. 5 to 18) according to an example embodiment of the disclosure may include a first wall (e.g., 311, 411, 511, or 611 in FIGS. 5 to 18) facing the first surface (e.g., 238 in FIG. 7A) and including the first camera hole (e.g., 313, 413, 513, or 613 in FIGS. 5 to 18) opened toward a space (e.g., 315 in FIG. 6).

The camera assembly (e.g., 300, 400, 500, or 600 in FIGS. 5 to 18) according to an example embodiment of the disclosure may include a second wall (e.g., 312, 412, 512, or 612 in FIGS. 5 to 18) facing the second surface (e.g., 298 in FIG. 7A) spaced apart from the first wall (311, 411, 511, or 611 in FIGS. 5 to 18), and including the second camera hole (e.g., 314, 414, 514, or 614 in FIGS. 5 to 18) opened toward the space (e.g., 315 in FIG. 6).

The camera assembly (e.g., 300, 400, 500, or 600 of FIGS. 5 to 18) according to an example embodiment of the disclosure may include a rotary body (e.g., 320, 420, 520, or 620 in FIGS. 5 to 18) rotatably disposed between the first camera hole (e.g., 313, 413, 513, or 613 of FIGS. 5 to 18)

and the second camera hole (e.g., 314, 414, 514, or 614 of FIGS. 5 to 18), and including a first reflective surface (e.g., 325 in FIG. 6) configured to reflect light passing through the first camera hole (e.g., 313, 413, 513, or 613; in FIGS. 5 to 18) and a second reflective surface (e.g., 326 in FIG. 6) configured to reflect light passing through the second camera hole (e.g., 314, 414, 514, or 614 in FIGS. 5 to 18).

The camera assembly (e.g., 300, 400, 500, or 600 in FIGS. 5 to 18) according to an example embodiment of the disclosure may include an image sensor (e.g., 352 in FIG. 6) spaced apart from the rotary body (e.g., 320, 420, 520, or 620 in FIGS. 5 to 18) and configured to receive light reflected from the first reflective surface (e.g., 325 in FIG. 6) and/or the second reflective surface (e.g., 326 in FIG. 6).

The camera assembly (e.g., 300, 400, 500, or 600 in FIGS. 5 to 18) according to an example embodiment of the disclosure may include an actuator (e.g., 570 in FIGS. 13A to 15) configured to move the image sensor (e.g., 352 in FIG. 6) along a direction in which the image sensor (e.g., 352 in FIG. 6) and the rotary body (e.g., 320, 420, 520, or 620 in FIGS. 5 to 18) are spaced from each other.

The actuator (e.g., 570 in FIG. 13A) according to an example embodiment of the disclosure may include an actuating coil (e.g., 5721 in FIGS. 13A to 15) configured to receive current and form a magnetic field.

The actuator (e.g., 570 in FIG. 13A) according to an example embodiment of the disclosure may include a magnet (e.g., 5722 in FIGS. 13A to 15) configured to move together with the image sensor (e.g., 352 in FIG. 6) and generate magnetic force with the actuating coil (e.g., 5721 in FIGS. 13A to 15).

The first wall (e.g., 511 in FIG. 13A) according to an example embodiment of the disclosure may include an accommodation space (e.g., 5111 in FIGS. 13A to 15) in which the actuating coil (e.g., 5721 in FIG. 13A to 15) is disposed.

The actuator (e.g., 570 in FIG. 13A) according to an example embodiment of the disclosure may include a slider (e.g., 5723 or 5724 in FIGS. 13A to 15) disposed between the image sensor (e.g., 352 in FIG. 6) and the first wall (e.g., 511 in FIGS. 13A to 15).

The actuator (e.g., 570 in FIG. 13A) according to an example embodiment of the disclosure may include a roller (e.g., 5715 in FIGS. 13A to 15) rotatably disposed between the image sensor (e.g., 352 in FIG. 6) and the first wall (e.g., 511 in FIGS. 13A to 15).

The camera assembly (e.g., 300, 400, 500, or 600 in FIGS. 5 to 18) according to an example embodiment of the disclosure may further include an image sensor assembly (e.g., 350, 450, or 550 in FIGS. 5 to 18) including an image sensor (e.g., 352 in FIG. 6) and an image sensor housing (e.g., 351 of FIG. 6) configured to accommodate the image sensor (e.g., 352 in FIG. 6).

The actuator (e.g., 570 in FIG. 13A) according to an example embodiment of the disclosure is capable of moving the image sensor housing (e.g., 351 in FIG. 6).

The camera assembly (e.g., 300, 400, 500, or 600 in FIGS. 5 to 18) according to an example embodiment of the disclosure may further include a lens barrel (e.g., 540 in FIGS. 13A to 15) disposed between the image sensor (e.g., 352 in FIG. 6) and the rotary body (e.g., 520 in FIGS. 13A to 15).

The actuator (e.g., 570 in FIG. 13A) according to an example embodiment of the disclosure may include a first actuator (e.g., 571 in FIGS. 13A to 15) configured to move the lens barrel (e.g., 540 in FIGS. 13A to 15) along a direction in which the image sensor (e.g., 352 in FIG. 6) and the rotary body (e.g., 520 in FIGS. 13A to 15) are spaced from each other.

The actuator (e.g., 570 in FIG. 13A) according to an example embodiment of the disclosure may include a second actuator (e.g., 572 in FIGS. 13A to 15) configured to move the image sensor (e.g., 352 in FIG. 6) along a direction in which the image sensor (e.g., 352 in FIG. 6) and the rotary body (e.g., 520 in FIGS. 13A to 15) are spaced from each other.

The camera assembly (e.g., 300, 400, 500, or 600 in FIGS. 5 to 18) according to an example embodiment of the disclosure may be configured to be driven in a first state in which the rotary body (e.g., 520 in FIGS. 13A to 15) closes the first camera hole (e.g., 513 in FIGS. 13A to 15) and opens the second camera hole (e.g., 514 in FIGS. 13A to 15).

The camera assembly (e.g., 300, 400, 500, or 600 in FIGS. 5 to 18) according to an example embodiment of the disclosure may be configured to be driven in a second state in which the rotary body (e.g., 520 in FIGS. 13A to 15) opens the first camera hole (e.g., 513 in FIGS. 13A to 15) and closes the second camera hole (e.g., 514 in FIGS. 13A to 15).

In the camera assembly (e.g., 300, 400, 500, or 600 in FIGS. 5 to 18) according to an example embodiment of the disclosure, a distance between the image sensor (e.g., 352 in FIG. 6) and the lens barrel (e.g., 540 in FIGS. 13A to 15) in a first state may be greater than the distance between the image sensor (e.g., 352 in FIG. 6) and the lens barrel (e.g., 540 in FIGS. 13A to 15) in a second state.

In the camera assembly (e.g., 300, 400, 500, or 600 in FIGS. 5 to 18) according to an example embodiment of the disclosure, the distance between the lens barrel (e.g., 540 in FIGS. 13A to 15) and the rotary body (e.g., 520 in FIGS. 13A to 15) in the first state may be greater than the distance between the lens barrel (e.g., 540 in FIGS. 13A to 15) and the rotary body (e.g., 520 in FIGS. 13A to 15) in the second state.

The camera assembly (e.g., 300, 400, 500, or 600 in FIGS. 5 to 18) according to an example embodiment of the disclosure may include a lens barrel (e.g., 540 in FIGS. 13A to 15) disposed between the image sensor (e.g., 352 in FIG. 6) and the rotary body (e.g., 520 in FIGS. 13A to 15).

The camera assembly (e.g., 300, 400, 500, or 600 in FIGS. 5 to 18) according to an example embodiment of the disclosure may further include a lens (e.g., 541 in FIGS. 13A to 15) disposed inside the lens barrel (e.g., 540 in FIGS. 13A to 15).

The camera assembly (e.g., 300, 400, 500, or 600 in FIGS. 5 to 18) according to an example embodiment of the disclosure may include a first coil (e.g., 331 in FIG. 6) arranged to surround at least a portion of the first camera hole (e.g., 313 in FIG. 6).

The camera assembly (e.g., 300, 400, 500, or 600 in FIGS. 5 to 18) according to an example embodiment of the disclosure may include a second coil (e.g., 332 in FIG. 6) arranged to surround at least a portion of the second camera hole (e.g., 314 in FIG. 6).

The camera assembly (e.g., 300, 400, 500, or 600 in FIGS. 5 to 18) according to an example embodiment of the disclosure may include a first magnetic body (e.g., 323 in FIG. 6) comprising a magnetic material arranged to be movable together with the rotary body (e.g., 320 in FIG. 6) and configured to generate magnetic force with the first coil (e.g., 331 in FIG. 6).

The camera assembly (e.g., 300, 400, 500, or 600 in FIGS. 5 to 18) according to an example embodiment of the disclosure may include a second magnetic body (e.g., 324 in FIG. 6) comprising a magnetic material arranged to be movable together with the rotary body (e.g., 320 in FIG. 6) and configured to generate magnetic force with the second coil (e.g., 332 in FIG. 6).

The rotary body (e.g., 320 in FIG. 6) according to an example embodiment of the disclosure may be configured to move toward the first camera hole (e.g., 313 in FIG. 6) by attractive force between the first coil (e.g., 331 in FIG. 6) and the first magnetic body (e.g., 323 in FIG. 6).

The rotary body (e.g., 320 in FIG. 6) according to an example embodiment of the disclosure may be configured to move toward the first camera hole (e.g., 313 in FIG. 6) by repulsive force between the second coil (e.g., 332 in FIG. 6) and the second magnetic body (e.g., 324 in FIG. 6).

The rotary body (e.g., 320 in FIG. 6) according to an example embodiment of the disclosure may be configured to close one of the first camera hole (e.g., 313 in FIG. 6) and the second camera hole (e.g., 314 in FIG. 6).

The electronic device (e.g., 200 in FIG. 4) according to an example embodiment of the disclosure may further include a display (e.g., 230 in FIG. 4) facing the first camera hole (e.g., 313 in FIG. 6) and defining the first surface (e.g., 238 in FIG. 7A).

An electronic device (e.g., 200 in FIG. 4) according to an example embodiment of the disclosure may include a housing (e.g., 201 in FIG. 4) including a first surface (e.g., 238 in FIG. 7A) and a second surface (e.g., 298 in FIG. 7A) spaced apart from the first surface (e.g., 238 in FIG. 7A).

The electronic device (e.g., 200 in FIG. 4) according to an example embodiment of the disclosure may include a camera assembly (e.g., 300, 400, 500, and 600 in FIGS. 5 to 18) at least partially disposed between the first surface (e.g., 238 in FIG. 7A) and the second surface (e.g., 298 in FIG. 7A) and including a space (e.g., 315 in FIG. 6) defined therein configured to allow light to propagate.

The camera assembly (e.g., 300, 400, 500, or 600 in FIGS. 5 to 18) according to an example embodiment of the disclosure may include a first wall (e.g., 311, 411, 511, or 611 in FIGS. 5 to 18) facing the first surface (e.g., 238 in FIG. 7A) and including the first camera hole (e.g., 313, 413, 513, or 613 in FIGS. 5 to 18) opened toward the space (e.g., 315 in FIG. 6).

The camera assembly (e.g., 300, 400, 500, or 600 in FIGS. 5 to 18) according to an example embodiment of the disclosure may include a second wall (e.g., 312, 412, 512, or 612 in FIGS. 5 to 18) facing the second surface (e.g., 298 in FIG. 7A) and spaced apart from the first wall (311, 411, 511, or 611 in FIGS. 5 to 18), and including the second camera hole (e.g., 314, 414, 514, or 614 in FIGS. 5 to 18) opened toward the space (e.g., 315 in FIG. 6).

The camera assembly (e.g., 300, 400, 500, or 600 in FIGS. 5 to 18) according to an example embodiment of the disclosure may include a first coil (e.g., 331 in FIG. 6) surrounding at least a portion of the first camera hole (e.g., 313, 413, 513, or 613 in FIGS. 5 to 18).

The camera assembly (e.g., 300, 400, 500, or 600 in FIGS. 5 to 18) according to an example embodiment of the disclosure may include a second coil (e.g., 332 in FIG. 6) surrounding at least a portion of the second camera hole (e.g., 314, 414, 514, or 614 in FIGS. 5 to 18).

The camera assembly (e.g., 300, 400, 500, or 600 of FIGS. 5 to 18) according to an example embodiment of the disclosure may include a rotary body (e.g., 320, 420, 520, or 620 of FIGS. 5 to 18) rotatably disposed between the first camera hole (e.g., 313, 413, 513, or 613 in FIGS. 5 to 18) and the second camera hole (e.g., 314, 414, 514, or 614 in FIGS. 5 to 18).

The camera assembly (e.g., 300, 400, 500, or 600 in FIGS. 5 to 18) according to an example embodiment of the disclosure may include a first magnetic body comprising a magnetic material (e.g., 323 in FIG. 6) disposed to be movable together with the rotary body (e.g., 320, 420, 520, or 620 in FIGS. 5 to 18).

The camera assembly (e.g., 300, 400, 500, or 600 in FIGS. 5 to 18) according to an example embodiment of the disclosure may include a second magnetic body comprising a magnetic material (e.g., 324 in FIG. 6) disposed to be movable together with the rotary body (e.g., 320, 420, 520, or 620 in FIGS. 5 to 18).

The camera assembly (e.g., 300, 400, 500, or 600 in FIGS. 5 to 18) according to an example embodiment of the disclosure may include a first reflective surface (e.g., 325 in FIG. 6) configured to be coupled to the first coil (e.g., 331 in FIG. 6) to close the first camera hole (e.g., 313, 413, 513, or 613 in FIGS. 5 to 18) by magnetic force between the first coil (e.g., 331 in FIG. 6) and the first magnetic body (e.g., 323 in FIG. 6).

The camera assembly (e.g., 300, 400, 500, or 600 in FIGS. 5 to 18) according to an example embodiment of the disclosure may include a second reflective surface (e.g., 326 in FIG. 6) configured to be coupled to the second coil (e.g., 332 in FIG. 6) to close the second camera hole (e.g., 314, 414, 514, or 614 in FIGS. 5 to 18) by magnetic force between the second coil (e.g., 332 in FIG. 6) and the second magnetic body (e.g., 324 in FIG. 6).

The camera assembly (e.g., 300, 400, 500, or 600 in FIGS. 5 to 18) according to an example embodiment of the disclosure may include an image sensor (e.g., 352 in FIG. 6) configured to receive light reflected from the first reflective surface (e.g., 325 in FIG. 6) or the second reflective surface (e.g., 326 in FIG. 6).

The rotary body (e.g., 320, 420, 520, or 620 in FIGS. 5 to 18) according to an example embodiment of the disclosure may be configured to move toward the first camera hole (e.g., 313, 413, 513, or 613 in FIGS. 5 to 18) by attractive force between the first coil (e.g., 331 in FIG. 6) and the first magnetic body (e.g., 323 in FIG. 6).

Each of the first coil (e.g., 331 in FIG. 6) and the second coil (e.g., 332 in FIG. 6) according to an example embodiment of the disclosure may include a winding body (e.g., 334 in FIG. 8A) configured to receive an applied current.

Each of the first coil (e.g., 331 in FIG. 6) and the second coil (e.g., 332 in FIG. 6) according to an example embodiment of the disclosure may include a buffer member comprising a compressible and expandable material (e.g., 333 in FIG. 8A) surrounding the winding body (e.g., 334 in FIG. 8A).

The camera assembly (e.g., 300, 400, 500, or 600 in FIGS. 5 to 18) according to an example embodiment of the disclosure may further include a support block (e.g., 360 in FIG. 11) to which the rotary body (e.g., 320, 420, 520, or 620 in FIGS. 5 to 18) is rotatably coupled.

The rotary body (e.g., 320, 420, 520, or 620 in FIGS. 5 to 18) according to an example embodiment of the disclosure may include a stopper (e.g., 327 in FIG. 11) protruding toward the support block (e.g., 360 in FIG. 11).

The support block (e.g., 360 in FIG. 11) according to an example embodiment of the disclosure may include a slit (e.g., 362 in FIG. 11) into which the stopper (e.g., 327 in FIG. 11) is movably inserted.

The slit (e.g., 362 in FIG. 11) according to an example embodiment of the disclosure may extend in an arc shape with respect to the rotation center (e.g., CR in FIG. 11) of the rotary body (e.g., 320 in FIG. 11).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device including a front side and a rear side, the electronic device comprising:
   a display disposed on the front side of the electronic device;
   a camera assembly, wherein at least a portion of the camera assembly is disposed between the front side and the rear side,
   wherein the camera assembly comprises:
   a case including a first camera hole and a second camera hole;
   a rotary body rotatably disposed in the case, wherein the rotary body includes a first reflective surface configured to reflect light passing through the first camera hole from the front side and a second reflective surface configured to reflect light passing through the second camera hole from the rear side, and wherein the first reflective surface and the second reflective surface are configured to rotate together according to rotation of the rotary body,
   an image sensor spaced apart from the rotary body and configured to receive light reflected on the first reflective surface or the second reflective surface,
   a lens barrel including a lens located on an optical path inside the camera assembly, and disposed between the image sensor and the rotary body, and
   an actuator configured to move at least one of the image sensor or the lens to adjust an angle of view of an image to be captured,
   wherein the actuator comprises:
   a first actuator configured to move the lens barrel along a direction in which the image sensor and the rotary body are spaced; and
   a second actuator configured to move the image sensor along the direction in which the image sensor and the rotary body are spaced.

2. The electronic device of claim 1, wherein the actuator comprises:
   an actuating coil configured to receive current and generate a magnetic field; and
   a magnet configured to move with the image sensor and to generate magnetic force with the actuating coil.

3. The electronic device of claim 2, wherein the case includes a first wall in which the first camera hole is formed, and
   wherein the first wall includes an accommodation space in which the actuating coil is disposed.

4. The electronic device of claim 1, wherein the case includes a first wall in which the first camera hole is formed, and
   wherein the actuator comprises a slider disposed between the image sensor and the first wall.

5. The electronic device of claim 1, wherein the case includes a first wall in which the first camera hole is formed, and wherein the actuator comprises a roller disposed between the image sensor and the first wall, and configured to rotate.

6. The electronic device of claim 1, further comprising an image sensor assembly comprising the image sensor and an image sensor housing accommodating the image sensor, wherein the second actuator is configured to move the image sensor housing.

7. The electronic device of claim 1, wherein the camera assembly is configured to be driven in one of a first state in which the rotary body closes the first camera hole and opens the second camera hole and a second state in which the rotary body opens the first camera hole and closes the second camera hole, and wherein a distance between the image sensor and the lens barrel in the first state is greater than a distance between the image sensor and the lens barrel in the second state.

8. The electronic device of claim 1, wherein the camera assembly is configured to be driven in one of a first state in which the first camera hole is closed and the second camera hole is open according to rotation of the rotary body and a second state in which the first camera hole is open and the second camera hole is closed according to rotation of the rotary body, and wherein a distance between the lens barrel and the rotary body in the first state is greater than a distance between the lens barrel and the rotary body in the second state.

9. The electronic device of claim 1, wherein the lens barrel is configured to be movable by the actuator.

10. The electronic device of claim 1, further comprising:

a first coil disposed around at least a portion of the first camera hole;

a second coil disposed around at least a portion of the second camera hole;

a first magnetic body configured to be movable together with the rotary body and to generate magnetic force with the first coil; and a second magnetic body configured to be movable together with the rotary body and to generate magnetic force with the second coil.

11. The electronic device of claim 10, wherein the rotary body is configured to move toward the first camera hole by attractive force between the first coil and the first magnetic body.

12. The electronic device of claim 10, wherein the rotary body is configured to move toward the first camera hole by repulsive force between the second coil and the second magnetic body.

13. The electronic device of claim 1, wherein, based on light passing through the first camera hole being reflected by the first reflective surface and entering the image sensor, the second reflective surface is configured to block passage of light through the second camera hole.

14. The electronic device of claim 1, wherein the first reflective surface and the second reflective surface form an included angle.

15. An electronic device comprising:

a housing comprising a first surface and a second surface spaced apart from the first surface; and a camera assembly including a space configured to allow light to propagate, wherein at least a portion of the camera assembly is disposed between the first surface and the second surface, wherein the camera assembly comprises:

a first wall facing the first surface and including a first camera hole open toward the space, a second wall including a second camera hole facing the second surface, spaced apart from the first wall, and open toward the space, a first coil surrounding at least a portion of the first camera hole, a second coil surrounding at least a portion of the second camera hole, a rotary body rotatably disposed between the first camera hole and the second camera hole, a first magnetic body configured to be movable together with the rotary body, a second magnetic body configured to be movable together with the rotary body, a first reflective surface coupled to the first coil and configured to close the first camera hole by magnetic force between the first coil and the first magnetic body, a second reflective surface coupled to the second coil and configured to close the second camera hole by magnetic force between the second coil and the second magnetic body, and an image sensor configured to receive light reflected from the first reflective surface and/or the second reflective surface.

16. The electronic device of claim 15, wherein the rotary body is configured to move toward the first camera hole by attractive force between the first coil and the first magnetic body.

17. The electronic device of claim 15, wherein each of the first coil and the second coil comprises:

a winding body configured to receive applied current; and a buffer member comprising a compressible and expandable material surrounding at least a part of the winding body.

18. The electronic device of claim 15, further comprising:

a support block to which the rotary body is rotatably coupled, wherein the rotary body comprises a stopper protruding toward the support block, and wherein the support block comprises a slit into which the stopper is movably inserted.

19. The electronic device of claim 18, wherein the slit extends in an arc shape with respect to a rotation center of the rotary body.

* * * * *